United States Patent
Kim et al.

(10) Patent No.: US 12,028,873 B2
(45) Date of Patent: *Jul. 2, 2024

(54) METHOD AND APPARATUS FOR TRANSMITTING AND RECEIVING CONTROL AND DATA CHANNELS IN WIRELESS COMMUNICATION SYSTEM

(71) Applicant: Samsung Electronics Co., Ltd., Gyeonggi-do (KR)

(72) Inventors: Taehyoung Kim, Gyeonggi-do (KR); Youngbum Kim, Gyeonggi-do (KR); Jeongho Yeo, Gyeonggi-do (KR); Jinyoung Oh, Gyeonggi-do (KR); Seunghoon Choi, Gyeonggi-do (KR); Heedon Gha, Gyeonggi-do (KR); Taehan Bae, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/096,782

(22) Filed: Jan. 13, 2023

(65) Prior Publication Data
US 2023/0156728 A1    May 18, 2023

Related U.S. Application Data

(63) Continuation of application No. 17/101,452, filed on Nov. 23, 2020, now Pat. No. 11,611,955, which is a (Continued)

(30) Foreign Application Priority Data

Sep. 8, 2017   (KR) .................. 10-2017-0115463

(51) Int. Cl.
*H04W 72/23*    (2023.01)
*H04L 1/1829*    (2023.01)
(Continued)

(52) U.S. Cl.
CPC .......... *H04W 72/23* (2023.01); *H04L 1/1861* (2013.01); *H04L 5/0051* (2013.01);
(Continued)

(58) Field of Classification Search
CPC . H04W 72/044; H04W 72/042; H04W 72/04; H04W 76/27; H04W 71/1289; H04W 76/30; H04W 74/0833; H04L 5/14
See application file for complete search history.

(56) References Cited

U.S. PATENT DOCUMENTS 10,849,118 B2    11/2020   Kim et al.
2011/0268064 A1    11/2011   Chen et al.
(Continued)

FOREIGN PATENT DOCUMENTS

CN    102573094    7/2012
CN    104904297    9/2015
(Continued)

OTHER PUBLICATIONS

Intel Corporation, "On PDCCH CORESET", R1-1712568, 3GPP TSG RAN WG1 #90, Aug. 21-25, 2017, 4 pages.
(Continued)

*Primary Examiner* — Iqbal Zaidi
(74) *Attorney, Agent, or Firm* — The Farrell Law Firm, P.C.

(57) ABSTRACT

Method of terminal, terminal, method of base station, and base station in wireless communication system are provided. Method of a terminal in the wireless communication system includes receiving, from a base station via radio resource control (RRC) signaling, information for a rate matching resource, identifying resources that are unavailable for physical downlink shared channel (PDSCH) reception based on the rate matching resource, monitoring a physical downlink control channel (PDCCH) candidate except for at least
(Continued)

one PDCCH candidate that overlaps with the identified resources, and receiving, from the base station, downlink control information (DCI) based on the monitoring of the PDCCH candidate.

20 Claims, 12 Drawing Sheets

Related U.S. Application Data continuation of application No. 16/410,668, filed on May 13, 2019, now Pat. No. 10,849,118, which is a continuation of application No. 16/126,469, filed on Sep. 10, 2018, now Pat. No. 10,674,497.

(51) Int. Cl.
  *H04L 5/00* (2006.01)
  *H04W 72/0446* (2023.01)
  *H04W 76/27* (2018.01)

(52) U.S. Cl.
  CPC .......... *H04L 5/0053* (2013.01); *H04L 5/0094* (2013.01); *H04W 72/0446* (2013.01); *H04W 76/27* (2018.02); *H04L 5/0048* (2013.01); *H04L 5/005* (2013.01)

(56) References Cited

U.S. PATENT DOCUMENTS

| | | | |
|---|---|---|---|
| 2013/0044706 | A1 | 2/2013 | Suzuki et al. |
| 2014/0126490 | A1 | 5/2014 | Chen et al. |
| 2015/0223254 | A1 | 8/2015 | Guo et al. |
| 2015/0358985 | A1 | 12/2015 | Chen et al. |
| 2016/0330004 | A1 | 11/2016 | Kim et al. |
| 2017/0142712 | A1 | 5/2017 | Lee et al. |
| 2017/0237537 | A1 | 8/2017 | Nogami et al. |
| 2018/0368115 | A1* | 12/2018 | Li .................. H04L 5/0053 |
| 2019/0021119 | A1* | 1/2019 | Ng .................. H04W 72/23 |
| 2019/0053272 | A1* | 2/2019 | Tsai .................. H04W 74/08 |

FOREIGN PATENT DOCUMENTS

| | | |
|---|---|---|
| CN | 105075364 | 11/2015 |
| KR | 10-2013-0016350 | 2/2013 |
| KR | 10-2016-0131944 | 11/2016 |
| WO | WO 2019/050306 | 3/2019 |

OTHER PUBLICATIONS

LG Electronics, "Discussion on CORESET Configuration", R1-1713166, 3GPP TSG RAN WG1 Meeting #90, Aug. 21-25, 2017, 7 pages.
International Search Report dated Dec. 18, 2018 issued in counterpart application No. PCT/KR2018/010444, 3 pages.
NTT DOCOMO, Inc., "Resource Sharing Between Data and Control Channels", R1-1711093, 3GPP TSG RAN WG1 NR Ad-Hoc#2, Jun. 27-30, 2017, 7 pages,.
NTT DOCOMO, Inc., "Resource Sharing Between PDCCH and PDSCH" R1-1713933, 3GPP TSG RAN WG1 Meeting #90, Aug. 21-25, 2017, 3 pages,.
NTT DOCOMO, Inc., "Dynamic Resource Sharing Between DL Data and Control Channels", R1-1702834, 3GPP TSG RAN WG1 Meeting #88, Feb. 13-17, 2017, 7 pages.
European Search Report dated Aug. 4, 2020 issued in counterpart application No. 18852905.1-1205, 14 pages.
ZTE, "Resource Sharing Between PDCCH and PDSCH", R1-1707163, 3GPP TSG RAN WG1 Meeting #89, May 15-19, 2017, 9 pages.
Samsung, "Search Space Design", R1-1710694, 3GPP TSG RAN WG1 NR Ad-Hoc#2, Jun. 27-30, 2017, 6 pages.
Huawei, HiSilicon, "Discussion on sPDCCH Design", R1-1704264, 3GPP TSG RAN WG1 Meeting #88b, Apr. 3-7, 2017, 16 pages.
Chinese Office Action dated Aug. 25, 2022 Issued in counterpart application No. 201880058423.5, 16 pages.
Nokia et al., "On the PDCCH Control Resource Set and its Connection to the Search Space for NR", R1-1714059, 3GPP TSG RAN WG1 #90, Aug. 21-25, 2017, 5 pages.
Korean Office Action dated Aug. 16, 2023 issued in counterpart application No. 10-2023-0004007, 11 pages.
Australian Examination Report dated Jul. 4, 2023 issued in counterpart application No. 2022228154, 3 pages.
European Search Report dated Dec. 18, 2023 issued in counterpart application No. 21207050.2-1213, 3 pages.

* cited by examiner

METHOD AND APPARATUS FOR TRANSMITTING AND RECEIVING CONTROL AND DATA CHANNELS IN WIRELESS COMMUNICATION SYSTEM

CROSS-REFERENCE TO RELATED APPLICATION(S)

This application is a Continuation Application of U.S. patent application Ser. No. 17/101,452, filed on Nov. 23, 2020, which is a Continuation Application of U.S. patent application Ser. No. 16/410,668, filed on May 13, 2019, now U.S. Pat. No. 10,849,118, issued Nov. 24, 2020, which is a Continuation Application of U.S. patent application Ser. No. 16/126,469, filed on Sep. 10, 2018, now U.S. Pat. No. 10,674,497, issued Jun. 2, 2020, and claims priority under 35 U.S.C. § 119(a) to Korean Patent Application No. 10-2017-0115463, filed in the Korean Intellectual Property Office on Sep. 8, 2017, the entire content of each of which is incorporated herein by reference.

BACKGROUND

1) Field

The present disclosure relates, generally, to a method and apparatus for transmitting and receiving downlink control and data channels in a wireless communication system, and more particularly, to a method for a base station to configure or indicate a slot-based or non-slot-based scheduling scheme to a terminal and a method for the terminal to transmit and receive according to the configuration or indication transmitted by the base station.

2) Description of the Related Art

To meet the demand for wireless data traffic which has increased since deployment of 4G communication systems, efforts have been made to develop an improved 5G or pre-5G communication system. A 5G or pre-5G communication system is also referred to as a "beyond 4G network" or a "post long term evolution (LTE) system." A 5G communication system is considered to be implemented in higher frequency (mmWave) bands, e.g., 60 GHz bands, so as to accomplish higher data rates. To decrease propagation loss of radio waves and increase transmission distance, beamforming, massive multiple-input multiple-output (MIMO), full dimensional MIMO (FD-MIMO), array antenna, analog beam forming, and large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-point (CoMP), reception-end interference cancellation, and the like. In a 5G system, hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet is now evolving to the Internet of things (IoT) where distributed entities, such as things, exchange and process information without human intervention. The Internet of everything (IoE), which is a combination of the IoT technology and big data processing technology through connection with a cloud server, has emerged. As technology elements, such as sensing technology, wired/wireless communication and network infrastructure, service interface technology, and security technology have been demanded for IoT implementation, a sensor network, a machine-to-machine (M2M) communication, machine type communication (MTC), and so forth have been recently researched. Such an IoT environment may provide intelligent Internet technology services that create a new value to life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described big data processing technology may also be considered to be an example of convergence between 5G technology and IoT technology.

SUMMARY

A 5G system may be designed to support both slot-based and non-slot-based scheduling techniques. An aspect of the present disclosure provides a method for a base station to configure or indicate a slot-based or non-slot-based scheduling scheme to a terminal and a method for the terminal to transmit and received according to the configuration or indication transmitted by the base station.

A 5G system may be designed for a base station to transmit a slot format indicator to a terminal via group-common downlink control information (DCI). The slot format may be configured in the form of a combination of downlink symbols, uplink symbols, and unknown symbols. An aspect of the present disclosure provides a method for utilizing unknown symbols.

A 5G system may be designed to configure certain time/frequency resources as reserved resources for various purposes. Neither a base station nor a terminal uses reserved resources for transmission or reception. An aspect of the present disclosure provides a method for a base station to transmit DCI and a method for a terminal to monitor a control resource set (CORESET) for the DCI in a case where part of the CORESET for transmitting downlink control channels is configured as reserved resources.

According to an aspect of the present disclosure, a method of a terminal in a wireless communication system is provided. The method includes receiving, from a base station via radio resource control (RRC) signaling, information for a rate matching resource, identifying resources that are unavailable for physical downlink shared channel (PDSCH) reception based on the rate matching resource, monitoring a physical downlink control channel (PDCCH) candidate except for at least one PDCCH candidate that overlaps with the identified resources, and receiving, from the base station, downlink control information (DCI) based on the monitoring of the PDCCH candidate.

According to another aspect of the present disclosure, a method of a base station in a wireless communication system is provided. The method includes transmitting, to a terminal via RRC signaling, information for a rate matching resource, and transmitting, to the terminal, DCI on a PDCCH, wherein resources are unavailable for PDSCH reception based on the rate matching resource, and wherein the PDCCH corresponds to a PDCCH candidate except for at least one PDCCH candidate that overlaps with the resources.

According to another aspect of the present disclosure, a terminal in a wireless communication system is provided. The terminal includes a transceiver, and a controller coupled with the transceiver and configured to receive, from a base station via RRC signaling, information for a rate matching resource, identify resources that are unavailable for PDSCH reception based on the rate matching resource, monitor a PDCCH candidate except for at least one PDCCH candidate that overlaps with the identified resources, and receive, from the base station, DCI based on the monitoring of the PDCCH candidate.

According to another aspect of the present disclosure, a base station in a wireless communication system is provided. The base station includes a transceiver, and a controller coupled with the transceiver and configured to transmit, to a terminal via RRC signaling, information for a rate matching resource, and transmit, to the terminal, DCI on a PDCCH, wherein resources are unavailable for PDSCH reception based on the rate matching resource, and wherein the PDCCH corresponds to a PDCCH candidate except for at least one PDCCH candidate that overlaps with the resources.

BRIEF DESCRIPTION OF THE DRAWINGS

The above and other aspects, features and advantages of certain embodiments of the disclosure will be more apparent from the following detailed description taken in conjunction with the accompanying drawings, in which.

DETAILED DESCRIPTION

Figure 1:
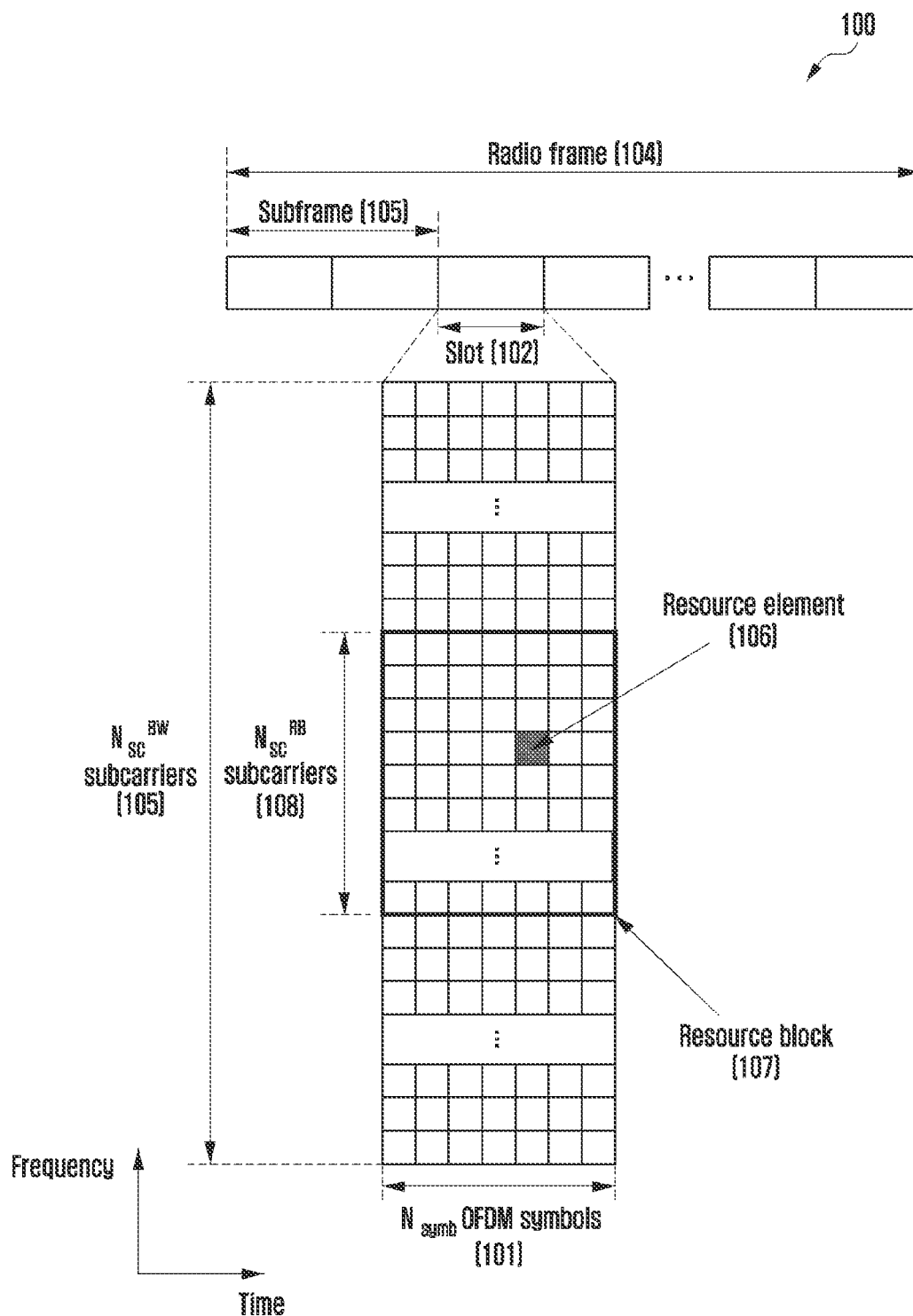
FIG. 1 is a diagram illustrating a basic time-frequency resource structure for transmitting downlink data and control channels in an LTE system.

Embodiments of the present disclosure are described below in detail with reference to the accompanying drawings. The same reference numbers are used throughout the accompanying drawings to refer to the same or like parts. Detailed descriptions of well-known functions and structures incorporated herein are omitted to avoid obscuring the subject matter of the present disclosure.

Detailed descriptions of technical specifications well-known in the art and unrelated directly to the present disclosure are omitted to avoid obscuring the subject matter of the present disclosure. Unnecessary descriptions are omitted so as to make clear the subject matter of the present disclosure.

For the above reason, some elements are exaggerated, omitted, or simplified in the accompanying drawings and, in practice, the elements may have different sizes and/or shapes from those shown in the accompanying drawings. Throughout the drawings, the same or equivalent parts are indicated by the same reference numbers.

Advantages and features of the present disclosure and methods of accomplishing the same may be understood more readily by reference to the following detailed description of embodiments and the accompanying drawings. The present disclosure may, however, be embodied in many different forms and is not intended to be limited to the embodiments set forth herein. Rather, the embodiments are provided so that the present disclosure is thorough and complete and fully conveys the present disclosure to those skilled in the art, and the present disclosure is defined by the appended claims and their equivalents. Like reference numerals refer to like elements throughout the present disclosure.

It will be understood that each block of the flowcharts and/or block diagrams, and combinations of blocks in the flowcharts and/or block diagrams, may be implemented by computer program instructions. These computer program instructions may be provided to a processor of a general-purpose computer, a special purpose computer, or another programmable data processing apparatus, such that the instructions that are executed via the processor of the computer or other programmable data processing apparatus create means for implementing the functions/acts specified in the flowcharts and/or block diagrams. These computer program instructions may also be stored in a non-transitory computer-readable memory that can direct a computer or other programmable data processing apparatus to function in a particular manner, such that the instructions stored in the non-transitory computer-readable memory produce articles of manufacture embedding instruction means that implement the function/act specified in the flowcharts and/or block diagrams. The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions/acts specified in the flowcharts and/or block diagrams.

Furthermore, the respective block diagrams may illustrate parts of modules, segments, or code including at least one or more executable instructions for performing certain logic function(s). Moreover, it should be noted that the functions of the blocks may be performed in a different order in several modifications. For example, two successive blocks may be performed substantially at the same time or may be performed in reverse order according to their functions.

According to an embodiment, the term "module", indicates, but is not limited to, a software or hardware component, such as a field programmable gate array (FPGA) or application specific integrated circuit (ASIC), which performs certain tasks. A module may advantageously be configured to reside on an addressable storage medium and be executed on one or more processors. Thus, a module may include, for example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented such that they execute one or more central processing units (CPUs) in a device or a secure multimedia card.

The mobile communication system has evolved to a high-speed, high-quality packet data communication system (such as high speed packet access (HSPA), LTE (or evolved universal terrestrial radio access (E-UTRA)), and LTE-Advanced (LTE-A) defined in 3rd Generation Partnership Project (3GPP), high rate packet data (HRPD) defined in 3rd Generation Partnership Project-2 (3GPP2), and Institute of Electrical and Electronics Engineers (IEEE) standard 802.16e) capable of providing data and multimedia services beyond the early voice-oriented services.

The LTE system as one of the representative broadband wireless communication systems uses orthogonal frequency division multiplexing (OFDM) in downlink and single carrier frequency division multiple access (SC-FDMA) in uplink. The term "uplink" denotes a radio transmission path from a terminal which is interchangeably referred to as user equipment (UE) and mobile station (MS) to a base station (BS) which is interchangeably referred to as evolved node B (eNB), and the term "downlink" denotes a radio transmission path from a base station to a terminal. Such multiple access schemes are characterized by allocating time-frequency resources for transmitting user-specific data and control information without overlapping each other, i.e., maintaining orthogonality, so as to distinguish among user-specific data and control information.

As a next generation communication system after LTE, the 5G communication system should be designed to meet various requirements of services demanded by users and service providers. The services supported by 5G systems may be categorized into three categories: enhanced mobile broadband (eMBB), massive machine type communications (mMTC), and ultra-reliable and low-latency communications (URLLC).

The eMBB aims to provide exceptionally high data rate in comparison with those supported by the legacy LTE, LTE-A, and LTE-A Pro. For example, the eMBB aims to increase the peak data rate up to 20 Gbps in downlink (DL) and 10 Gbps in uplink (UL) per base station. Simultaneously, eMBB aims to increase the user-perceived data rate. In order to meet such requirements, it is necessary to improve signal transmission/reception technologies including MIMO technique. The data rate requirements for the 5G communication systems may be met by use of a frequency bandwidth broader than 20 MHz in the frequency band of 3 to 6 GHz or above 6 GHz instead of the current LTE band of 2 GHz.

In addition, the mMTC is considered to support application services for IoT. In order to provide mMTC-based IoT application services effectively, it is required to secure massive access resources for terminals within a cell, improve terminal coverage and battery life, and reduce device manufacturing cost. The IoT services should be designed to support a large number of terminals (e.g., 1,000,000 terminals/km$^2$) within a cell in consideration of the nature of the IoT terminals that are attached to various sensors and devices for providing a communication function. By the nature of the IoT services, the mMTC terminals are likely to be located in coverage holes such as a basement of a building, which requires broader coverage in comparison with other services being supported in the 5G communication system. The mMTC terminals that are characterized by their low prices and battery replacement difficulty should be designed to have a very long battery lifetime.

Finally, the URLLC is targeted for mission-critical cellular-based communication services such as remote robot and machinery control, industrial automation, unmanned aerial vehicle, remote health care, and emergency alert services that are requiring ultra-low latency and ultra-high reliability. Accordingly, a URLL service requires an ultra-low latency and ultra-high reliability. For example, a URLLC service must meet the requirements of air-interface latency lower than 0.5 ms and a packet error rate less than or equal to $10^{-5}$. In this respect, in order to support the URLLC services, the 5G system must support transmit time intervals (TTI) less than those of other services and assign broad resources in the frequency band. Accordingly, the 5G system must support a short TTI for the URLLC, which is less than those for other services, and allocate broad resources in a frequency band to secure reliability of the communication link.

The three categories of services, i.e., eMBB, URLLC, and mMTC may be multiplexed into one system. In order to meet the different service-specific requirements, the different categories of services may be transmitted/received with different transmission/reception schemes and parameters.

A description of the frame structure of the LTE and LTE-A system hereinafter is provided with reference to the accompanying drawings.

FIG. 1 is a diagram illustrating a basic time-frequency resource structure for transmitting downlink data and control channels in an LTE system.

Referring to FIG. 1, the horizontal axis denotes time, and the vertical axis denotes frequency. The smallest transmission unit in the time domain is an OFDM symbol, and $N_{symb}$ OFDM symbols 101 form a slot 102, and 2 slots forms a subframe 105. Each slot spans 0.5 ms, and each subframe spans 1.0 ms. A radio frame 104 is a time unit consisted of 10 subframes. In the frequency domain, the smallest transmission unit is a subcarrier, and the total system transmission bandwidth consists of $N_{BW}$ subcarriers 109. In the time-frequency resource structure, the basic resource unit is a resource element (RE) 106 indicated by an OFDM symbol index and a subcarrier index. A resource block (RB) (or physical resource block (PRB)) 107 is defined by $N_{symb}$ consecutive OFDM symbols 101 in the time domain and $N_{RB}$ consecutive subcarriers 108 in the frequency domain. That is, one RB 107 consists of $N_{symb} \times N_{RB}$ REs 106. Typically, the RB is the smallest data transmission unit. In the LTE system, $N_{symb}=7$, $N_{RB}=12$, and $N_{BW}$ and $N_{RB}$ are proportional to the system transmission bandwidth.

Next, a description of the DCI for LTE and LTE-A systems is provided.

In the LTE system, the downlink or uplink data scheduling information is transmitted from an eNB to the UE using DCI. The DCI is categorized into different DCI formats depending on the purpose, e.g., indicating UL grant for UL data scheduling or DL grant for DL data scheduling, indicating usage for control information that is small in size, indicating whether multiple antenna-based spatial multiplexing is applied, and indicating usage for power control. For example, the DCI format 1 for a DL grant is configured to include at least the following information.

Resource allocation type 0/1 flag: Resource allocation type 0/1 flag indicates whether the resource allocation scheme is Type 0 or Type 1. Type-0 is used to allocate resources in units of RBG by applying a bitmap scheme. In the LTE system, the basic unit of scheduling may be an RB that is expressed by time-frequency domain resources, and the RBG may include multiple RBs and may be the basic unit of scheduling in the Type-0 scheme. Type-1 is used to allocate a particular RB in an RBG.

Resource block assignment: Resource block assignment indicates an RB allocated for data transmission. The resources may be determined depending on the system bandwidth and the resource allocation scheme.

Modulation and coding scheme (MCS): MCS indicates a modulation scheme used for data transmission and a size of a transport block to be transmitted.

Hybrid automatic repeat request (HARQ) process number: a HARQ process number indicates a process number of a HARQ.

New data indicator: a new data indicator indicates whether a HARQ transmission is an initial transmission or a retransmission.

Redundancy version: a redundancy version indicates a redundancy version of a HARQ.

Transmit power control (TPC) command for physical uplink control channel (PUCCH): a TPC command for a PUCCH indicates a power control command for a PUCCH that is an uplink control channel.

The DCI may be transmitted over a PDCCH or an EPDCCH after undergoing a channel coding and modulation process.

A cyclic redundancy check (CRC) is attached to a DCI message payload and is scrambled with a radio network temporary identifier (RNTI) of a UE. There are different types of RNTIs for the different purposes of the DCI message, e.g., a UE-specific data transmission, a power control command, and a random access response. That is, the RNTI is not transmitted explicitly but is included during the CRC calculation procedure. Upon receipt of a DCI message on the PDCCH, the UE performs a CRC check with an assigned RNTI and determines, if the CRC check succeeds, the message is addressed to itself.

Figure 2:
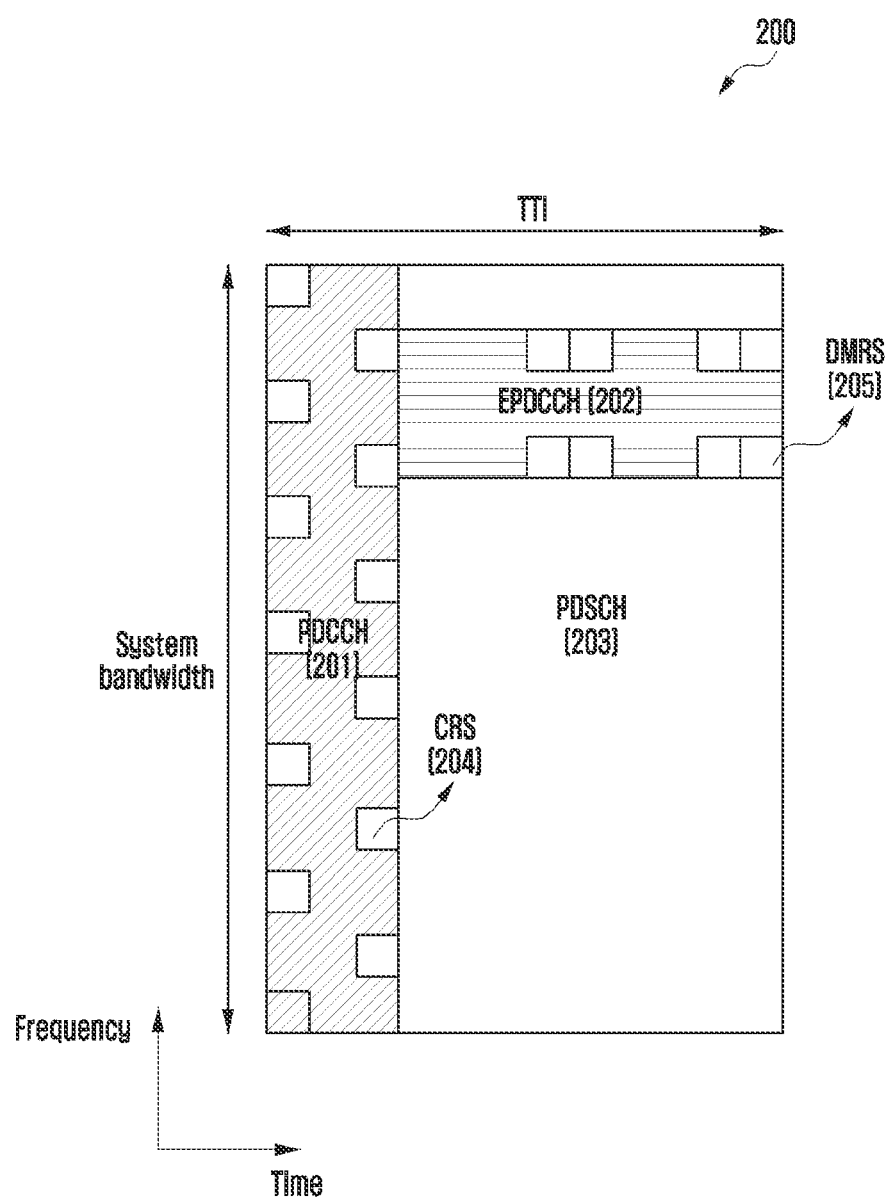
FIG. 2 is a diagram illustrating physical downlink control channel (PDCCH) and enhanced PDCCH (EPDCCH) as downlink physical channels carrying an LTE DCI.

FIG. 2 is a diagram illustrating a PDCCH 201 and an EPDCCH 202 as downlink physical channels carrying an LTE DCI.

Referring to FIG. 2, the PDCCH 201 is time-division-multiplexed (TDM) with a physical downlink shared channel (PDSCH) 203 as a data channel and spread across the whole system bandwidth. The control region for transmitting the PDCCH 201 may be expressed by a number of OFDM symbols, which is indicated by a control format indicator (CFI) being transmitted in a physical control format indicator channel (PCFICH) to a UE. The PDCCH 201 is mapped to a few OFDM symbols at the beginning of a subframe such that the UE promptly decodes the downlink scheduling information for use in decoding a downlink shared channel (DL-SCH) without delay, resulting in a contribution to downlink transmission delay reduction. Assuming that a PDCCH conveys one DCI message, it may occur that multiple UEs' PDCCHs are transmitted per cell when multiple UEs are scheduling in downlink and uplink. As a reference signal for decoding PDCCH 201, a cell-specific reference signal (CRS) 204 is used. The CRS 204 is spread across the whole system bandwidth and transmitted in every subframe with different scrambling and resource mapping determined according to a cell identifier (ID). The CRS 204 cannot be beamformed in a UE-specific manner because it is a common reference signal in use by all of the UEs located within the cell. Accordingly, the multiantenna transmission of LTE PDCCH is limited to the open-loop transmission diversity. The number of CRS ports is implicitly notified to the UE via physical broadcast channel (PBCH) decoding.

Resource allocation for PDCCH 201 is performed based on a control-channel element (CCE), and one CCE consists of 9 resource element groups (REGs), i.e. 36 REs. The PDCCH 201 may be transmitted on 1, 2, 4, or 8 CCEs, and the number of CCEs is determined depending on the channel coding rate of the DCI message payload. The reason for using different numbers of CCEs is to achieve link adaptation of the PDCCH 201. A UE must detect the PDCCH 201 without information thereon through blind decoding within a search space, which is a set of CCEs. The search space is a group of CCEs composed of an aggregation level (AL), which is implicitly determined based on a function of the UE identity and a subframe number rather than explicitly signaled. The UE performs blind decoding of all possible resource candidates available with the CCEs within the search space to decode the PDCCH 201 and process the information verified as valid for the UE through a CRC test.

There are two types of search spaces: the UE-specific search space and the common search space. A group of UEs or all of the UEs may monitor the common search space of the PDCCH 201 to receive cell-specific control information such as dynamic scheduling for system information and a paging message. For example, it may be possible to receive DL-SCH scheduling assignment information for transmitting system information block-1 (SIB-1) including operator information of the cell by decoding the common search space of the PDCCH 201.

As shown in FIG. 2, an EPDCCH 202 is multiplexed with a PDSCH 203 in frequency. An eNB may allocate resources for the EPDCCH 202 and the PDSCH 203 appropriately through scheduling to effectively support coexistence with the data transmission to the legacy LTE UE. However, an issue arises in that the EPDCCH 202 spanning one subframe contributes to the transmission delay. It may occur that multiple EPDCCHs 202 constitute an EPDCCH set for which resources are allocated by a PRB pair. The EPDCCH set location is configured in a UE-specific manner, and the EPDCCH set location information is transmitted via radio resource control (RRC) signaling. A UE may be assigned up to two EPDCCH sets, and one of the EPDCCH sets may be multiplexed with those of other UEs.

The resource allocation for EPDCCH 202 is performed based on enhanced CCE (ECCE), where one ECCE consists of 4 or 8 enhanced REGs (EREGs), and the number of EREGs per ECCE is determined depending on the cyclic prefix (CP) length and subframe configuration information. One EREG consists of 9 REs, where there may be up to 16 EREGs per PRB pair. There are two different ways of transmitting the EPDCCHs 202 according to the mapping scheme of EREGs to REs: "localized" and "distributed." There are 6 possible ECCE aggregation levels of 1, 2, 4, 8, 16, and 32 of which one is selected based on the CP length, subframe configuration, EPDCCH format, and transmission scheme.

The EPDCCH 202 is transmitted only in the UE-specific search space. Accordingly, the UE must monitor the common search spaces for the PDCCH 201 to receive the system information.

The EPDCCH 202 carries demodulation reference signal (DMRS) 205. The eNB may perform precoding on the EPDCCH 202 and use UE-specific beamforming Without notice of the precoding in use for the EPDCCH 202, the UEs may decode the EPDCCH 202. The EPDCCH 202 is configured with the same DMRS pattern used for the PDSCH 203. However, the DMRS 205 may support up to 4 antenna ports in the EPDCCH 202 unlike in the PDSCH 203. The DMRS 205 may be transmitted only in the PRB to which the EPDCCH 202 is mapped.

The port configuration information of the DMRS 205 differs depending on the EPDCCH transmission mode. In the localized transmission mode, the antenna ports corresponding to the ECCEs to which the EPDCCH 202 is mapped are selected based on the UE ID. In the case where the same ECCEs are shared by multiple UEs, i.e., multiuser MIMO is used for transmission, the DMRS antenna ports may be assigned for the respective UE. The DMRS 205 may also be transmitted in a shared manner and, in this case, it is possible to distinguish the UEs using DMRS scrambling sequences configured through high layer signaling. In the distributed transmission mode, it is possible to support up to two antenna ports for the DMRS 205 and a precoder cycling-based diversity scheme. The DMRS 205 mapped to the REs within the same PRB pair may be shared.

In LTE, the whole PDCCH region is made up of a set of CCEs in a logical domain, and there are search spaces made up of sets of CCEs. The search spaces are divided into common search spaces and UE-specific search spaces, and the search space for LTE PDCCH is defined as shown in Table 1 below.

TABLE 1

The set of PDCCH candidates to monitor are defined in terms of search spaces, where a search space $S_k^{(L)}$ at aggregation level $L \in \{1, 2, 4, 8\}$ is defined by a set of PDCCH candidates.
For each serving cell on which PDCCH is monitored, the CCEs corresponding to PDCCH candidate m of the search space $S_k^{(L)}$ are given by
$L \{(Y_k + m') \mod \lfloor N_{CCE,k}/L \rfloor\} + i$
where $Y_k$ is defined below, $i = 0, \ldots, L - 1$. For the common search space $m' = m$. For the PDCCH UE specific search space, for the serving cell on which PDCCH is monitored, if the monitoring UE is configured with carrier indicator field then $m' = m + M^{(L)} \cdot n_{CI}$ where $n_{CI}$ is the carrier indicator field value, else if the monitoring UE is not configured with carrier indicator field then $m' = m$, where $m = 0, \ldots, M^{(L)} - 1$. $M^{(L)}$ is the number of PDCCH candidates to monitor in the given search space.
Note that the carrier indicator field value is the same as ServCellIndex
For the common search spaces, $Y_k$ is set to 0 for the two aggregation levels $L = 4$ and $L = 8$.
For the UE-specific search space $S_k^{(L)}$ at aggregation level L, the variable $Y_k$ is defined by
$Y_k = (A \cdot Y_{k-1}) \mod D$
where $Y_{-1} = n_{RNTI} \neq 0$, $A = 39827$, $D = 65537$ and $k = \lfloor n_s/2 \rfloor$, $n_s$ is the slot number within a radio frame.
The RNTI value used for $n_{RNTI}$ is defined in subclause 7.1 in downlink and subclause 8 in uplink.

According to the above definition of search space for PDCCH, the UE-specific search space is defined based on a function of the UE identity and a subframe number rather than explicitly signaled. That is, the UE-specific search space may change depending on the subframe, i.e., as time goes by, which makes it possible to overcome an issue in which a search space in use by one UE is prevented from being used by another user (blocking issue). Although a UE cannot be scheduled in a subframe because all CCEs which the UEs are searching are in use by another terminal in the same subframe, this issue may not occur in the next subframe because the search space changes as time goes by. For example, although the UE-specific search spaces of UE #1 and UE #2 are partially overlapped in a certain subframe, the UE may predict that the overlapping situation may change in the next subframe because the UE-specific search spaces vary in every subframe.

According to the above definition of search space for a PDCCH, the common search space is defined by a predetermined set of CCEs in order to make it possible for a group of UEs or all of the UEs to receive the corresponding PDCCH. That is, the common search space does not change according to the UE identity or subframe number. Although the common search space is required for transmitting various system messages, the common search space may also be used for transmitting UE-specific control information. This indicates that the common search space may be used as a solution for scheduling a UE in the case of a lack of available resources for scheduling the UE in the UE-specific search space.

The search space is a set of control channel candidates corresponding to the CCEs where the UE attempts to decode its control channel, and a UE has multiple search spaces for several aggregation levels as groups of CCEs. For LTE PDCCH, the numbers of PDCCH candidates to be monitored by the UE within the search spaces being determined according to the aggregation level are listed in Table 2 below.

TABLE 2

| Type | Search space $S_k^{(L)}$ | | Number of PDCCH candidates $M^{(L)}$ |
|---|---|---|---|
| | Aggregation level L | Size [in CCEs] | |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

As shown in Table 2 above, the UE-specific search spaces are in use at aggregation levels $\{1, 2, 4, 8\}$ and have the respective PDCCH candidates $\{6, 6, 2, 2\}$. The common search spaces are in use at aggregation levels $\{4, 8\}$ have the respective PDCCH candidates $\{4, 2\}$. The reason for use of common search spaces at only the two aggregation levels $\{4, 8\}$ is to secure good coverage because the system message should reach the cell edge.

The DCIs being transmitted in the search space is defined only in certain DCI formats such as DCI format 0/1A/3/3A/1C for system information and transmit power control. In the common search space, the DCI formation for spatial multiplexing is not supported. The DCI format to be decoded in the UE-specific search space differs depending on the configured transmission mode. Since the transmission mode is configured via RRC signaling, an accurate subframe number for use in determining whether the corresponding configuration is valid for the corresponding terminal is not provided. Accordingly, the UE always attempts decoding with DCI format 1A to maintain communication regardless of the transmission mode.

Hereinabove, descriptions are provided of the downlink control channel and control information transmission/reception method and the search spaces in use for legacy LTE and LTE-A.

A description is made hereinafter of the downlink control channels under discussion currently for use in a 5G communication with reference to the accompanying drawings.

Figure 3:
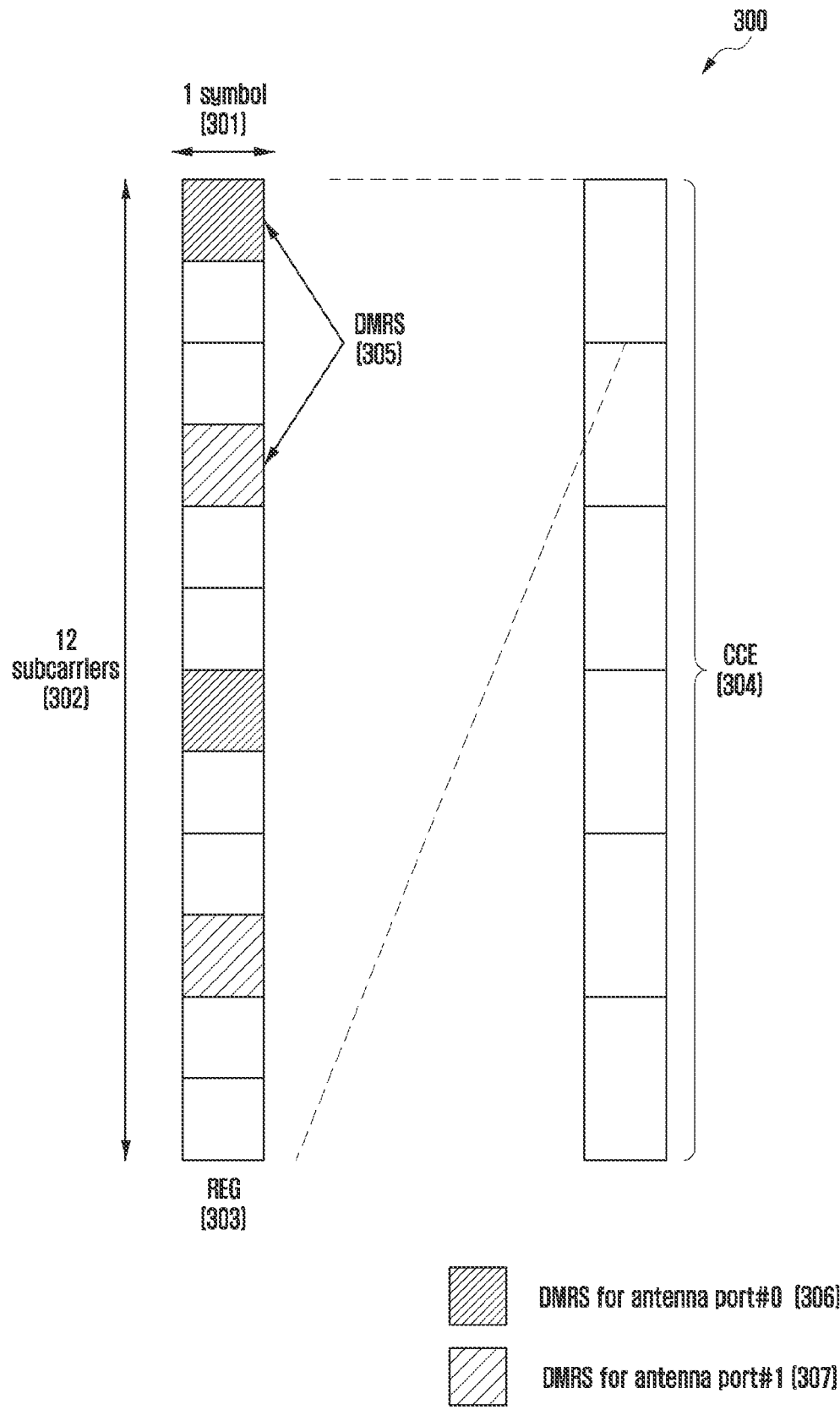
FIG. 3 is a diagram illustrating a basic unit of time and frequency resources for a downlink control channel in a 5G system.

FIG. 3 is a diagram illustrating a basic unit of time and frequency resources 300 for a downlink control channel in a 5G system. With reference to FIG. 3, a REG as the basic unit of time and frequency resources for a control channel is made up of one OFDM symbol 301 in the time domain and 12 subcarriers 302, i.e. one RB, in the frequency domain. By assuming one OFDM symbol as a basic unit of control channel resources in the time domain, it may be possible to multiplex data and control channels in one subframe. The control channel is followed by a data channel to reduce processing time at a UE, thereby facilitating meeting the latency requirement. By using 1 RB 302 as the basic unit of control channel resources in the frequency domain, it may be possible to facilitate multiplexing of the control and data channels in frequency.

By concatenating multiple REGs, it is possible to configure various control channel regions in different sizes. For example, assuming that the basic unit of downlink control channel resource allocation is CCE 304 in 5G, the CCE 304 may be made up of a plurality of REGs. For the REG 303 depicted in FIG. 3, the REG 303 is made up of 12 REs and, assuming one CCE consists of 6 REGs, the CCE 304 consists of 72 REs. If the downlink control region is configured, the control region may consist of multiple CCEs 304, and a certain downlink control channel may be mapped to one or more CCEs according to the AL in the control region. The CCEs constituting the control region are distinguished by CCE numbers, which are assigned in a way of logical mapping.

The basic unit of downlink control channel resources, i.e., REG 303, depicted in FIG. 3 may include REs to which DCI is mapped and REs to which DMRS 305 as a reference signal for use in decoding the DCI is mapped. The DMRS 305 may be mapped in consideration of the number of antenna ports in use for transmitting the downlink control channel FIG. 3 depicts a case where two antenna ports are in use. The DMRS 306 and DMRS 307 may be transmitted for antenna port #0 and antenna port #1, respectively. The DMRSs for different antenna ports may be multiplexed in various manners. FIG. 3 depicts a case where the DMRSs for different antenna ports are mapped to different REs for maintaining orthogonality. The DMRSs may be frequency-division-multiplexed (FDMed) as depicted in FIG. 3 or code-division multiplexed (CDMed). The DMRS may be configured in various DMRS patterns in association with the number of antenna ports.

Figure 4:
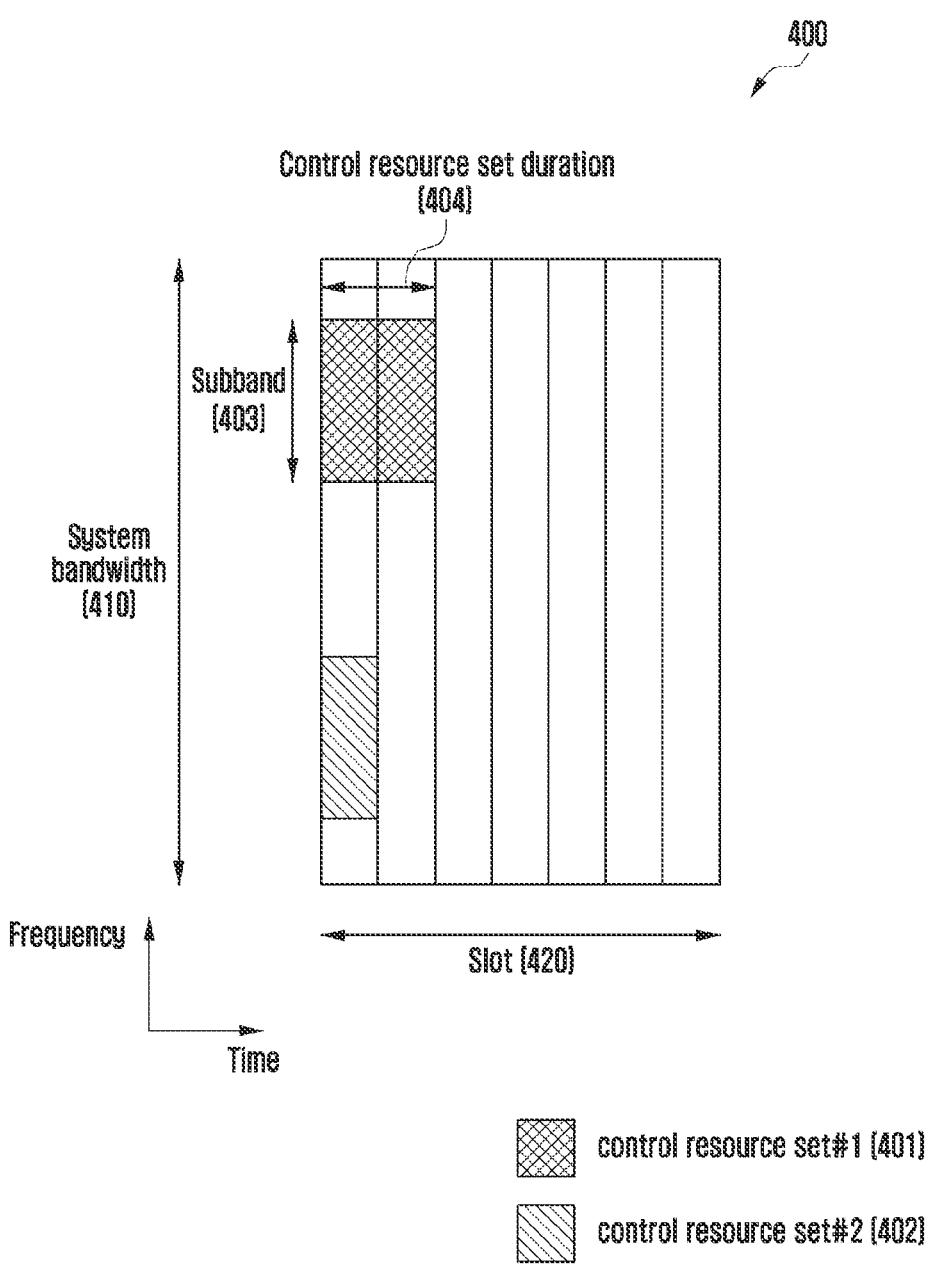
FIG. 4 is a diagram illustrating how to configure a CORESET for transmitting downlink control channels in a 5G wireless communication system.

FIG. 4 is a diagram 400 illustrating how to configure a CORESET for transmitting downlink control channels in a 5G wireless communication system according to an embodiment of the present disclosure. FIG. 4 shows that a time-frequency resource structure of the system bandwidth 410 in frequency and one slot 420 in time (in the embodiment of FIG. 4, it is assumed that 1 slot consists of 7 OFDM symbols) includes two CORESETs, i.e., CORESET #1 401 and CORESET #2 402. The CORESETs #1 and #2 401 and 402 may be configured in certain sub-bands 403 within the system bandwidth 410 in the frequency domain. A CORESET may span one or multiple OFDM symbols in the time domain and may be referred to as control resource set duration 404.

A base station may configure the 5G CORESET to a terminal via higher layer signaling (e.g., system information, master information block (MIB), and RRC signaling). If a terminal is configured with a CORESET, this indicates that the base station provides the terminal with the information on the CORESET location, sub-band, CORESET resource allocation, and CORESET length. This configuration information may include information as listed in Table 3 below.

TABLE 3

Configuration information 1. RB allocation in frequency domain
Configuration information 2. CORESET start symbol
Configuration information 3. CORESET symbol length
Configuration information 4. REG bundling size
Configuration information 5. Transmission mode (Interleaved or non-interleaved transmission mode)
Configuration information 6. Search space type (common search space, group-common search space, UE-specific search space)
Configuration information 7. Monitoring interval
Others It may also be possible to configure other information necessary for transmitting the downlink control channel to the terminal in addition to the aforementioned information.

Figure 5:
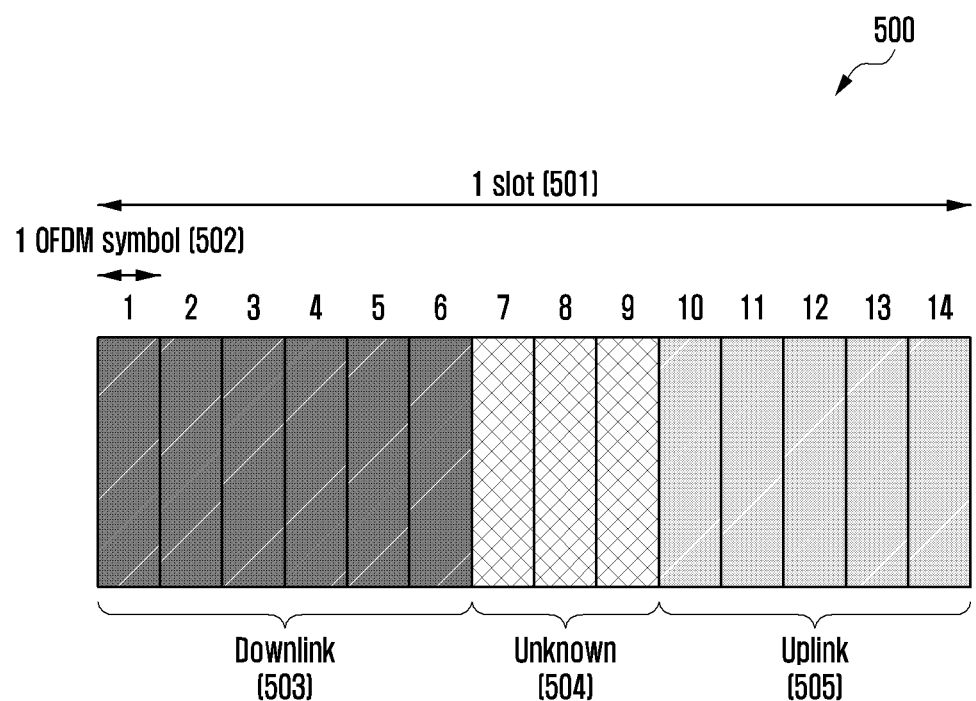
FIG. 5 is a diagram illustrating a 5G slot format.

FIG. 5 is a diagram illustrating a 5G slot format 500.

Referring to FIG. 5, in 5G, one slot 501 may consist of 14 OFDM symbols 502. The slot 501 may be made up of downlink symbols 503, uplink symbols 505, and unknown symbols 504. If a symbol is a downlink symbol 503, this indicates that transmission occurs in the direction from a base station to a terminal, i.e., the base station transmits and the terminal receives during the corresponding symbol. If a symbol is an uplink symbol 505, this indicates that transmission occurs in the direction from a terminal to a base station, i.e., the terminal transmits and the base station receives during the corresponding symbol. If a symbol is an unknown symbol 504, this indicates that there may be no transmission between a base station and a terminal during the corresponding symbol. However, the unknown symbol 504 may be overridden by another DCI and, in this case, the unknown symbol 504 may be used for a certain purpose as indicated by an indicator of the DCI.

One slot may be made up of uplink symbols 505, downlink symbols 503, and unknown symbols 504, and a certain combination of the uplink, downlink, and unknown symbols 505, 503, and 504 may be referred to as a slot format. That is, each of the 14 symbols constituting a slot may be one of the uplink, downlink, and unknown symbols 505, 503, and 504, and the possible number of slot formats may become $3^{14}$. FIG. 5 is a diagram illustrating an exemplary slot format in which the $1^{st}$ to 6th symbols are downlink symbols 503, the $7^{th}$ to $9^{th}$ symbols are unknown symbols 504, and the $10^{th}$ to $14^{th}$ symbols are uplink symbols 505.

The base station may notify the terminal of the slot format via a slot format indicator (SFI). The SFI may be transmitted on a group-common PDCCH. The group-common PDCCH may convey one or more SFIs, which may indicate different slot formats of the slots following in sequence. The base station may configure a terminal to monitor a group-common PDCCH and, in this case, the terminal may monitor the group-common PDCCH to acquire an SFI. The terminal may obtain the slot format(s) of certain slot(s) based on the acquired SFI and determine whether each symbol is a downlink symbol 503, an uplink symbol 505, or an unknown symbol 504 according to the obtained slot format.

A description is made hereinafter of the method for transmitting a DMRS necessary for decoding a PDSCH which is being considered for use in the 5G communication system.

Figure 6:
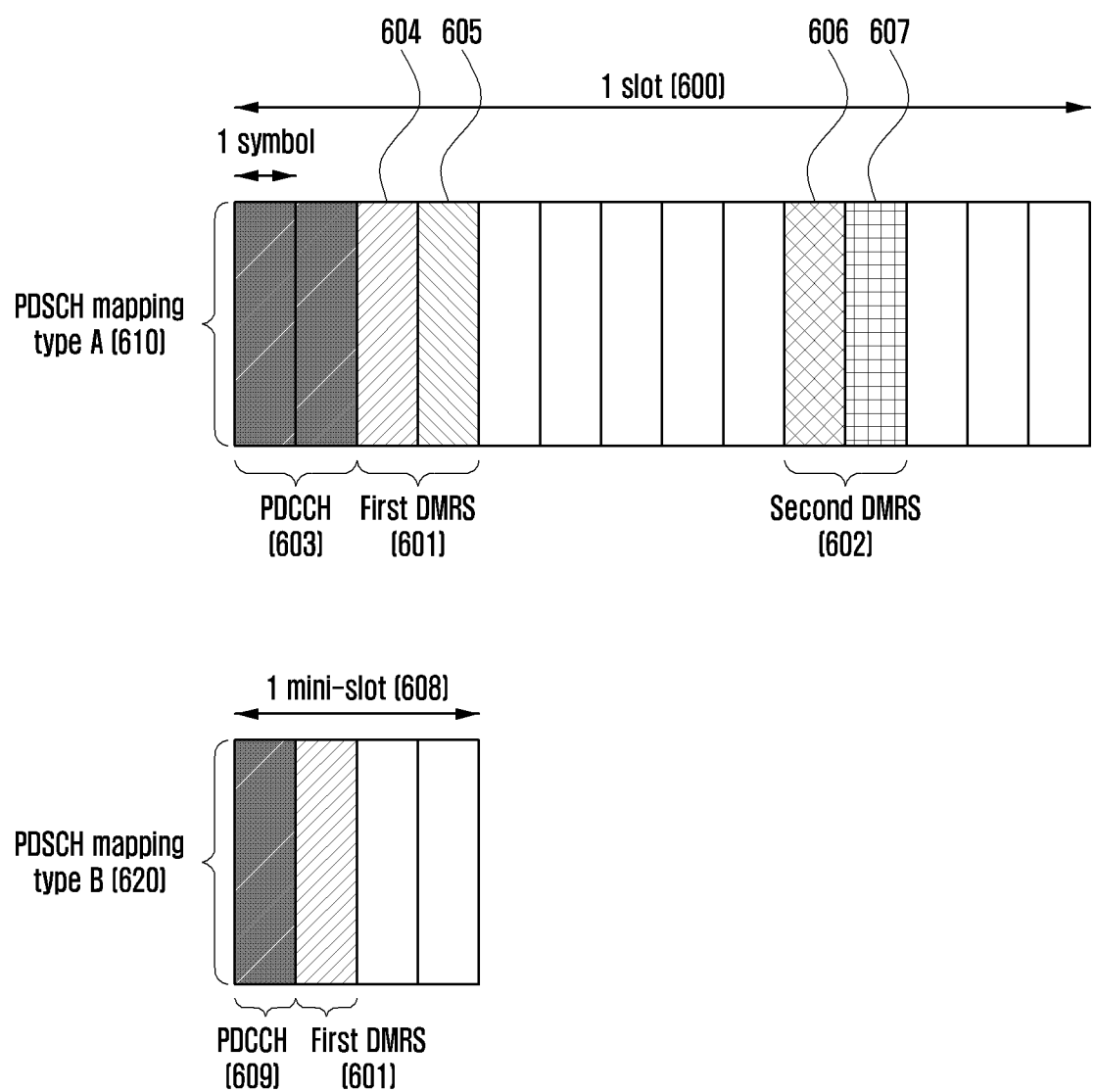
FIG. 6 is a diagram of a method for transmitting DMRS in a 5G communication system.

FIG. 6 is a diagram of a method for transmitting a DMRS necessary for decoding a PDCCH, which is being considered for use in the 5G communication system.

Referring to FIG. 6, the DMRS locations differ depending on the PDSCH mapping type in the 5G communication system. In FIG. 6, reference number 610 denotes PDSCH mapping type A corresponding to slot-based scheduling, and reference number 620 denotes PDSCH mapping type B corresponding to non-slot-based or mini-slot-based scheduling. The slot-based scheduling is characterized in that PDSCH is scheduled over 1 slot 600, and the non-slot-based or mini-slot-based scheduling is characterized in that PDSCH is scheduled over a mini-slot 608 configured with a predetermined number of symbols.

The 5G communication system supports two types of DMRS: first DMRS 601 (or front-loaded DMRS) and second DMRS 602 (or additional DMRS). The first DMRS 601 is introduced in 5G to reduce processing time by making in possible to promptly perform channel estimation for PDSCH decoding. The second DMRS 602 is introduced in 5G for the purposes of channel estimation performance enhancement, phase distortion compensation, and tracking at a terminal moving fast. It is inevitable to transmit the first DMRS 601 for PDSCH decoding, and the second DMRS 602 may be transmitted additionally depending on the configuration of the base station. The second DMRS 602 may be transmitted repetitively in the same pattern as that of the first DMRS 601. The symbol positions for transmitting the first DMRS 601 may vary depending on the PDSCH mapping type. In the case of the PDSCH mapping type A 610, the first DMRS 601 may be transmitted at the third OFDM symbol (or fourth OFDM symbol). In the case of the PDSCH mapping type B 620, the first DMRS 601 may be transmitted at the first OFDM symbol of the resources scheduled for PDSCH. The symbol position for transmitting the second DMRS 602, which is still under discussion, may be fixed or configured by the base station and notified to the terminal via DCI.

The 5G communication system supports two types of DMRS, and the DMRS types determines the number of ports and DMRS transmission pattern. In the case of DMRS type 1, it is possible to support up to 4 ports for 1-OFDM symbol transmission and up to 8 ports for 2-OFDM symbol transmission. In the case of DMRS type 2, it is possible to support up to 6 ports for 1-OFDM symbol transmission and 12 ports for 2-OFDM symbol transmission. That is, the maximum number of supportable DMRS ports is determined depending on the number of OFDM symbols for DMRS transmission.

In the embodiment of FIG. 6, the PDSCH mapping type A 610 is characterized by the first DMRS 601 mapped to the 3rd and 4th OFDM symbols 604 and 605, respectively, and the second DMRS 602 mapped to the 10th and 11th OFDM symbols 606 and 607, respectively.

Hereinafter, a description is made of the BWP configuration method being considered for use in the 5G communication system.

Figure 7:
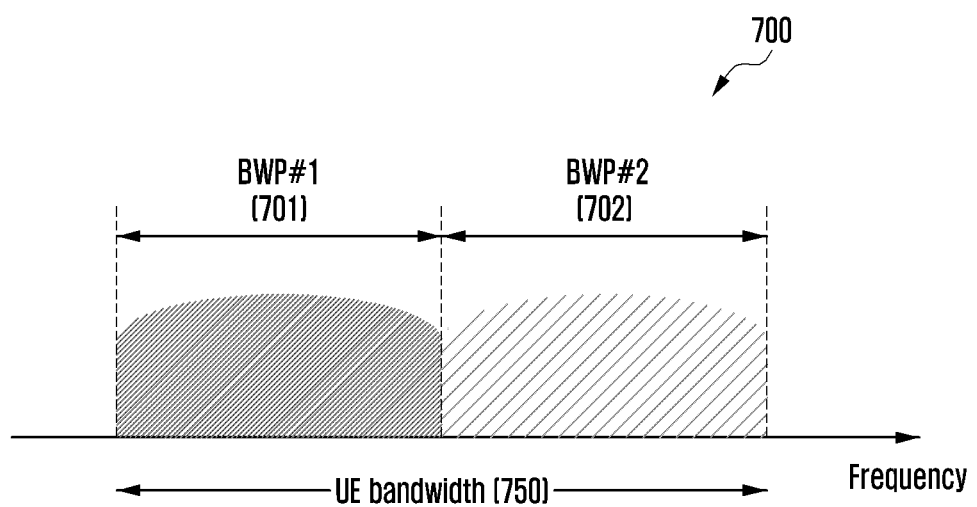
FIG. 7 is a diagram illustrating a configuration of bandwidth parts (BWPs) in a 5G communication system.

FIG. 7 is a diagram illustrating an exemplary configuration of BWPs 700 in a 5G communication system.

Referring to FIG. 7, the terminal bandwidth 750 is divided into two BWPs, i.e., BWP #1 701 and BWP #2 702. The base station may configure one or multiple BWPs to the terminal, and each BWP is configured with the information listed in Table 4 below.

TABLE 4

Configuration information 1. Bandwidth of BWP (number of PRBs constituting BWP)
Configuration information 2. Frequency location of BWP (Offset from a reference point, which may be a center frequency of a TABLE 4-continued component carrier, a synchronization signal, synchronization signal raster, or the like)
Configuration information 3. Numerology of BWP (e.g., subcarrier spacing, CP, or the like)
Other The terminal may be further configured with other BWP-related parameters in addition to the above configuration information. The base station may transmit aforementioned information to the terminal via higher layer signaling, e.g., RRC signaling. It may be possible to activate at least one of the configured BWPs. The base station may transmit information indicating whether to activate a BWP to the terminal quasi-statically via RRC signaling or medium access control (MAC) control element (CE) or DCI.

In 5G, the BWP may be configured for various purposes.

For example, it may be possible to configured BWPs for the case where the system bandwidth is broader than the bandwidth supported by the terminal. It may be possible for the terminal to transmit data at a certain frequency location in the system bandwidth by way of example of configuring the frequency location of a BWP to the terminal (configuration information 2 in Table 4 above).

For example, the base station may configure multiple BWPs to the terminal for the purpose of supporting different numerologies. For example, in order for a terminal to support data communications with two subcarrier spacings of 15 kHz and 30 kHz, it may be possible to configure two BWPs with different subcarrier spacings of 15 kHz and 30 kHz. The BWPs different in subcarrier spacing may be FDMed and, if it is required to communicate data at a certain subcarrier spacing, the BWP configured with the corresponding subcarrier spacing may be activated.

For example, the base station may configure multiple BWPs different in bandwidth to the terminal for the purpose of reducing power consumption of the terminal. For example, if the terminal supporting a very broad bandwidth, e.g., 100 MHz, always performs data communication via the corresponding bandwidth, this may result in significant power consumption. For example, monitoring an unnecessary downlink control channel with the broad bandwidth of 100 MHz in a situation with no traffic is very inefficient in view of power consumption. For the purpose of reducing power consumption of the terminal, the base station may configure a BWP with a relatively narrow BWP, e.g., BWP of 20 MHz. In this case, the terminal may monitor the BWP of 20 MHz in the situation with no traffic and, if data to transmit/receive occur or a command is received from the base station, the terminal may transmit/receive the data in the BWP of 100 MHz.

The present disclosure relates to a method and apparatus for transmitting and receiving downlink control and data channels in a wireless communication system.

As described above, a 5G communication system may support both the PDSCH mapping type A (or slot-based scheduling) and PDSCH mapping type B (or non-slot-based scheduling). DMRS locations may vary depending on the scheduling scheme, i.e., slot-base scheduling and non-slot-base scheduling. Accordingly, there is a need for sharing information on whether to use slot-based scheduling or non-slot based scheduling between the base station and the terminal in advance. The present disclosure provides a method for a base station to notify a terminal of a scheduling scheme (slot/non-slot-based scheduling) to be used and a terminal operation based on the scheduling scheme notification.

As described above, the SFI may be transmitted on a group-common PDCCH in 5G. In this case, a base station may notify a terminal of the purpose of using the unknown symbols in the slot including downlink, uplink, and unknown symbols via additional DCI. The terminal may use the unknown symbols for the purpose indicated by an indicator received from the base station. The present disclosure provides additional signaling for indicating the usage of the unknown symbols (e.g., downlink transmission, uplink transmission, gap, and measurement) and operations of the base station and terminals based on the usage of the unknown symbols.

In 5G, certain time/frequency resources may be configured as reserved resources for various purposes. A base station and a terminal may not use the reserved resources for communication. The reserved resources may be used for guaranteeing forward compatibility and configured with the highest priority on arbitrary time and frequency resources under the determination of the base station. The present disclosure provides a method for a base station to transmit downlink control information and for a terminal to monitor a CORESET for the downlink control information in a situation where part of the CORESET designed for transmitting downlink control channels is configured as reserved resources.

Embodiments of the present disclosure are described below in detail with reference to the accompanying drawings. Although the description is directed to an LTE or an LTE-A system, it will be understood by those skilled in the art that the present disclosure may be applied to other communication systems having a similar technical background and channel format. For example, the present disclosure is applicable to the 5G communication system (5G new radio (NR)) developed after LTE-A. Thus, it will be understood by those skilled in the art that the present disclosure may be applied to other communication/computing systems, with a slight modification, without departing from the scope and spirit of the present disclosure.

Detailed descriptions of well-known functions and structures incorporated herein are omitted to avoid obscuring the subject matter of the present disclosure. Further, the following terms are defined in consideration of the functionality in the present disclosure, and may vary according to the intention of a user or an operator, usage, etc. Therefore, a definition should be made on the basis of the overall content of the present disclosure.

Embodiment 1

Embodiment 1 is directed to a method and apparatus for supporting a PDSCH scheduling scheme, i.e., PDSCH mapping type A (slot-based scheduling) and PDSCH mapping type B (non-slot-based scheduling).

A base station may configure the PDSCH mapping type A or PDSCH mapping type B to a terminal via higher layer signaling (e.g., system information, cell-specific RRC signaling, UE-specific RRC signaling, and MAC CE). If the base station configures PDSCH mapping type A to the terminal, the base station may transmit the first DMRS at the 3rd or 4th OFDM symbol. If the base station configures PDSCH mapping type B to the terminal, the base station may transmit the first DMRS at the first symbol in the resources scheduled for the corresponding PDSCH.

The terminal may receive configuration information indicating the PDSCH mapping type A or the PDSCH mapping type B from the base station via higher layer signaling (e.g., system information, cell-specific RRC signaling, UE-specific RRC signaling, and MAC CE). If the PDSCH mapping type A is configured to the terminal, the terminal may receive the first DMRS at the 3rd or 4th OFDM symbol. If the PDSCH mapping type B is configured to the terminal, the terminal may receive the first DMRS at the first OFDM symbol of the resources scheduled for the PDSCH.

Hereinafter, a description is made of the method for a base station to configure PDSCH mapping type A or PDSCH mapping type B to a terminal.

Embodiment 1-1

In embodiment 1-1, a base station may configure to a terminal the PDSCH mapping type A or B per BWP.

The base station may configure per-BWP PDSCH mapping types (PDSCH mapping type A or B) to the terminal via part of the BWP configuration.

The base station may transmit the configuration information to the terminal via higher layer signaling, e.g., UE-specific RRC signaling and MAC CE signaling.

That is, the base station may configure per-BWP PDSCH mapping types to the terminal. In detail, the base station may configure BWP #1 and BWP #2 to the terminal. The per-BWP configuration information may determine the PDSCH mapping type of the corresponding BWP. For example, it may be possible to configure each of BWP #1 and BWP #2 with PDSCH mapping type A or B.

If the base station configures the PDSCH mapping type A to a certain BWP of the terminal, the base station may transmit the first DMRS at the 3rd or 4th OFDM symbols in the PDSCH of the corresponding BWP. If the base station configures the PDSCH mapping type B to a specific BWP of the terminal, the base station may transmit the first DMRS at the first OFDM symbol in the resources scheduled for the PDSCH of the corresponding BWP.

The terminal may receive the PDSCH mapping type per BWP from the base station.

The terminal may receive the information indicating the PDSCH mapping type of the corresponding BWP via part of the BWP configuration.

The terminal may determine the DMRS locations in the PDSCH scheduled in the corresponding BWP based on the configuration information indicating the BWP-specific PDSCH mapping type. If a certain BWP is configured with PDSCH mapping type A, the terminal may receive the first DMRS at the $3^{rd}$ or $4^{th}$ OFDM symbol in the corresponding BWP. If a certain BWP is configured with PDSCH mapping type B, the terminal may receive the first DMRS at the 1st OFDM symbol of the resources scheduled for PDSCH in the corresponding BWP.

According to embodiment 1-1, the method is advantageous in terms of making it possible to configure multiple PDSCH mapping types to the terminal in a BWP-specific manner. This indicates that a terminal may be simultaneously configured with both the PDSCH mapping types A and B. For example, if BWP #1 and BWP #2 are configured with the PDSCH mapping types A and B respectively, the base station may schedule a PDSCH transmission in BWP #1 with the PDSCH mapping type A and in BWP #2 with the PDSCH mapping type B.

In embodiment 1-1, a BWP may be substituted for a component carrier in carrier aggregation (CA). That is, the base station may configure a PDSCH mapping type to the terminal per component carrier, and the terminal may determine a PDSCH reception scheme per carrier based on the configuration information.

Embodiment 1-2

In embodiment 1-2, the base station may configure to the terminal the per-CORESET PDSCH mapping type (PDSCH mapping type A or B) for PDSCH being scheduled via the DCI transmitted on the corresponding CORESET.

The base station may also configure per-CORESET PDSCH mapping type (PDSCH mapping type A or B) for the PDSCH being scheduled via the DCI transmitted on the corresponding CORESET using part of the configuration information for the CORESET carrying the downlink control channel.

The base station may transmit the configuration information to the terminal via higher layer signaling, e.g., UE-specific RRC signaling and MAC CE signaling.

The base station may configure one or more CORESETs to the terminal via higher layer signaling (e.g., MIB, SIB, and RRC signaling). For example, the base station may configure CORESET #1 and CORESET #2 to the terminal. The base station may also configure to the terminal the PDSCH mapping type A for the PDSCH being scheduled via the DCI transmitted on the CORESET #1 and the PDSCH mapping type B for the PDSCH being scheduled via the DCI transmitted on the CORESET #2.

If the base station wants to transmit PDSCH to the terminal in the PDSCH mapping type A, the base station may transmit the DCI containing the scheduling information for the corresponding PDSCH in the CORESET configured in association with the PDSCH mapping type A and, in this case, the first DMRS for use in decoding the corresponding PDSCH may be transmitted at the $3^{rd}$ or $4^{th}$ OFDM symbol.

If the base station wants to transmit PDSCH to the terminal in the PDSCH mapping type B, the base station may transmit the DCI containing the scheduling information for the corresponding PDSCH in the CORESET configured with the PDSCH mapping type B and, in this case, the first DMRS for use in decoding the corresponding PDSCH may be transmitted at the first OFDM symbol in the resources scheduled for the corresponding PDSCH.

The terminal may receive the configuration information indicating whether the per-CORESET PDSCH mapping type for the PDSCH being scheduled via the DCI transmitted on the corresponding CORESET is the PDSCH mapping type A or B from the base station.

The terminal may also receive the configuration information indicating whether the PDSCH mapping type for the PDSCH being scheduled via the DCI transmitted on the corresponding CORESET is the PDSCH mapping type A or B using part of the CORESET configuration information conveying the downlink control channel.

The terminal may receive the configuration information about one or more CORESETs via high layer scheduling (e.g., MIB, SIB, and RRC signaling). The terminal may perform blind decoding to decode DCI in the configured CORESET.

If the UE obtains the DCI conveying PDSCH scheduling information in the CORESET configured with the PDSCH mapping type A, the UE may receive the first DMRS for use in decoding the corresponding PDSCH at the 3rd or 4th OFDM symbol under the assumption of the PDSCH mapping type A. As a consequence, the terminal may receive and decode the PDSCH based on the scheduling information carried in the DCI.

If the UE obtains the DCI conveying the PDSCH scheduling information in the CORESET configured in association with the PDSCH mapping type B, the UE may receive the first DMRS for use in decoding the corresponding PDSCH at the first OFDM symbol in the resources scheduled for the corresponding PDSCH under the assumption of the PDSCH mapping type B. As a consequence, the terminal may receive and decode the PDSCH based on the scheduling information carried in the DCI.

According to embodiment 1-2, the method is advantageous in terms of making it possible to configure multiple PDSCH mapping types to the terminal. This indicates that a terminal may be simultaneously configured with both the PDSCH mapping types A and B. In addition, the method is advantageous in terms of maximizing scheduling flexibility by scheduling PDSCH with both the PDSCH mapping types A and B in the whole bandwidth of the terminal without limit to any specific frequency band in the terminal bandwidth. For example, in the case where the CORESET #1 and CORESET #2 are configured in association with the PDSCH mapping types A and B respectively, the base station may transmit to the terminal one DCI for scheduling PDSCH in the CORESET #1 in association with the PDSCH mapping type A and another DCI for scheduling PDSCH in the CORESET #2 in association with the PDSCH mapping type B.

In embodiment 1-2, a CORESET may be substituted for a search space (or sub-search space). That is, the base station may configure a PDSCH mapping type per search space within a CORESET, and the terminal may determine the PDSCH mapping type for scheduling PDSCH based on the DCI per search space in the CORESET based on the configuration information.

Embodiment 1-3

In embodiment 1-3, a DCI format is defined per PDSCH mapping type.

For example, it may be possible to define DCI format A for scheduling PDSCH in association with the PDSCH mapping type A and DCI format B for scheduling PDSCH in association with the PDSCH mapping type B.

The DCI formats A and B may differ in size from each other.

The DCI formats A and B may be scrambled with different RNTIs. For example, the DCI format A may be scrambled with a Ca-RNTI while the DCI format B may be scrambled with a Cb-RNTI.

The base station may configure the terminal to monitor the DCI format A corresponding to the PDSCH mapping type A, the DCI format B corresponding to the PDSCH mapping type B, or both the DCI formats A and B.

The base station may transmit the corresponding configuration information to the terminal via higher layer signaling, e.g., UE-specific RRC signaling and MAC CE signaling.

If the base station wants to transmit to the terminal a PDSCH in the PDSCH mapping type A, the base station may transmit to the terminal the scheduling information about the corresponding PDSCH in the DCI format A corresponding to the PDSCH mapping type A. In this case, the first DMRS for use in decoding the corresponding PDSCH may be transmitted at the $3^{rd}$ or $4^{th}$ OFDM symbol.

If the base station wants to transmit to the terminal a PDSCH in PDSCH mapping type B, it may transmit to the terminal the scheduling information about the corresponding PDSCH in the DCI formation B corresponding to the PDSCH mapping type B. In this case, the first DMRS for use in decoding the corresponding PDSCH may be transmitted at the first OFDM symbol in the resources scheduled for the corresponding PDSCH.

The terminal may receive the configuration information transmitted by the base station for configuring the terminal to monitor the DCI format A corresponding to the PDSCH mapping type A, the DCI format B corresponding to the PDSCH mapping type B, or both the DCI formats A and B. The base station may transmit the configuration information to the terminal via higher layer signaling, e.g., UE-specific RRC signaling and MAC CE signaling.

The terminal may receive the configuration information transmitted by the base station for configuring the terminal to configure one or more CORESETs via higher layer signaling (e.g., MIB, SIB, and RRC signaling). The terminal may perform blind decoding to decide a DCI in the configured CORESET. The terminal may perform blind decoding in the CORESET(s) for the DCI format A, the DCI format B, or the both the DCI formats A and B based on the configuration information.

If the terminal detects the DCI format A, the terminal may assume that the PDSCH being scheduled via the corresponding DCI is transmitted in the PDSCH mapping type A and then perform decoding on the corresponding PDSCH to receive the first DMRS at the 3rd or 4th OFDM symbol. As a consequence, the terminal may receive and decode the PDSCH based on the scheduling information in the DCI.

If the terminal detects the DCI format B, the terminal may assume that the PDSCH being scheduled via the corresponding DCI is transmitted in the PDSCH mapping type B and then receive the first DMRS for use in decoding the corresponding PDSCH at the first OFDM symbol in the resources scheduled for the corresponding PDSCH. As a consequence, the terminal may receive and decode the PDSCH based on the scheduling information in the DCI.

In embodiment 1-3, it may be possible to configure both the PDSCH mapping types A and B simultaneously. For example, if the base station configures the terminal to monitor both the DCI formats A and B, the base station may transmit the scheduling information with the DCI format A for the case of transmitting the PDSCH to the corresponding to the terminal in the PDSCH mapping type A and the DCI format B for the case of transmitting the PDSCH to the corresponding terminal in the PDSCH mapping type B. According to embodiment 1-3, the method is advantageous in terms of maximizing the scheduling flexibility by scheduling PDSCH with both the PDSCH mapping types A and B in the whole bandwidth of the terminal without limit to any specific frequency band in the terminal bandwidth. In addition, the method is advantageous in terms of supporting both the PDSCH mapping types A and B without extra CORESET configuration.

Embodiment 1-4

In embodiment 1-4, a base station may configure to a terminal a PDSCH mapping type (PDSCH mapping type A or B) via part of the configuration information about the first DMRS.

The base station may transmit the configuration information to the terminal via higher layer signaling, e.g., terminal-specific RRC signaling and MAC CE signaling.

If the base station configures the PDSCH mapping type A to the terminal in association with the first DMRS, the base station may transmit the PDSCH to the terminal in the PDSCH mapping type A such that the first DMRS for use in receiving the PDSCH is mapped to the $3^{rd}$ or $4^{th}$ OFDM symbol.

If the base station configures the PDSCH mapping type B to the terminal in association with the first DMRS, the base station may transmit the PDSCH to the terminal in the PDSCH mapping type B such that the first DMRS for use in receiving the PDSCH is mapped to the 1st OFDM symbol in the resources scheduled for the corresponding PDSCH.

The terminal may receive the configuration information transmitted by the base station for configuring the terminal with the PDSCH mapping type A or B using part of the configuration information about the first DMRS.

If the terminal is configured with the PDSCH mapping type A in association with the first DMRS, the terminal may receive the first DMRS for use in receiving the corresponding PDSCH at the $3^{rd}$ or $4^{th}$ OFDM symbol under the assumption that the PDSCH is transmitted in the PDSCH mapping type A.

If the terminal is configured with the PDSCH mapping type B in association with the first DMRS, the terminal may receive the first DMRS for use in receiving the corresponding PDSCH at the $1^{st}$ OFDM symbol in the resources scheduled for the corresponding PDSCH under the assumption that the PDSCH is transmitted in the PDSCH mapping type B.

Embodiment 1-5

In embodiment 1-5, the PDSCH mapping type (i.e., PDSCH mapping type A or B) is implicitly determined based on a system parameter.

For example, the PDSCH mapping type may be implicitly determined according to a PDCCH monitoring period.

The base station may configure a PDCCH monitoring period to the terminal via higher layer signaling, e.g., RRC signaling. In order to configure the PDSCH mapping type A, the base station may set the PDCCH monitoring period T of the terminal to a value greater than or equal to a predetermined threshold η. In order to configure the PDSCH mapping type B, the base station may set the PDCCH monitoring period T of the terminal to a value less than the threshold value.

The terminal may receive the configuring information including the PDCCH monitoring period from the base station via higher layer signaling, e.g., RRC signaling. If the PDCCH monitoring period T is set to a value greater than or equal to the threshold q, the terminal may assume the PDSCH mapping type A. If the PDCCH monitoring period T is set to a value less than the threshold q, the terminal may assume the PDSCH mapping type B.

The threshold q may be a system parameter set to a fixed value, e.g., one slot and one subframe.

Alternatively, the PDSCH mapping type may be determined based on a time pattern for monitoring PDCCH.

The base station may configure a time pattern for PDCCH monitoring to the terminal via higher layer signaling, e.g., RRC signaling. In this case, the time pattern for PDCCH monitoring may be defined as indices of symbols or slots at which the PDCCH monitoring is performed.

In order to configure the PDSCH mapping type A, the base station may configure a time pattern for PDCCH monitoring with a unit of slots to the terminal. That is, the base station may configure a set of slot indices indicating the slots at which PDCCH monitoring is performed. For example, the PDCCH monitoring pattern may be configured to perform PDCCH monitoring at the $1^{st}$, $3^{rd}$, $5^{th}$, and $7^{th}$ slots among 10 slots.

In order to configure the PDSCH mapping type B, the base station may configure a time pattern for PDCCH monitoring pattern with a unit of symbols to the terminal. That is, the base station may configure a set of symbol indices indicating the symbols at which PDCCH monitoring is performed. For example, the PDCCH monitoring pattern may be configured to perform PDCCH monitoring at the $1^{st}$, $3^{rd}$, $5^{th}$ and $7^{th}$ OFDM symbols among 14 symbols.

The terminal may receive the configuration information indicating the time pattern for PDCCH monitoring from the base station via higher layer signaling, e.g., RRC signaling. If the time pattern for PDCCH monitoring is configured as a unit of slots, the terminal may assume the PDSCH mapping type A. If the temporal PDCCH monitoring pattern is configured as a pattern of symbols, the terminal may assume the PDSCH mapping type B.

Embodiment 1-6

In embodiment 1-6, the PDSCH mapping type is dynamically notified to a terminal via DCI.

A base station may notify the terminal of the PDSCH mapping type (PDSCH mapping type A or B) for transmitting PDSCH via the DCI scheduling the PDSCH. For example, the base station may notify the terminal of the PDSCH mapping type using a 1-bit indicator included in the DCI. The terminal may check the indicator field indicating the PDSCH mapping type in the received DCI to determine whether the PDSCH mapping type for transmitting the PDSCH scheduled via the DCI is the PDSCH type A or B.

Embodiment 2

Embodiment 2 is directed to a slot format indicator-based dynamic TDD method and a method for use of unknown symbols for certain uses in a slot format in 5G.

Embodiment 2-1

Figure 8:
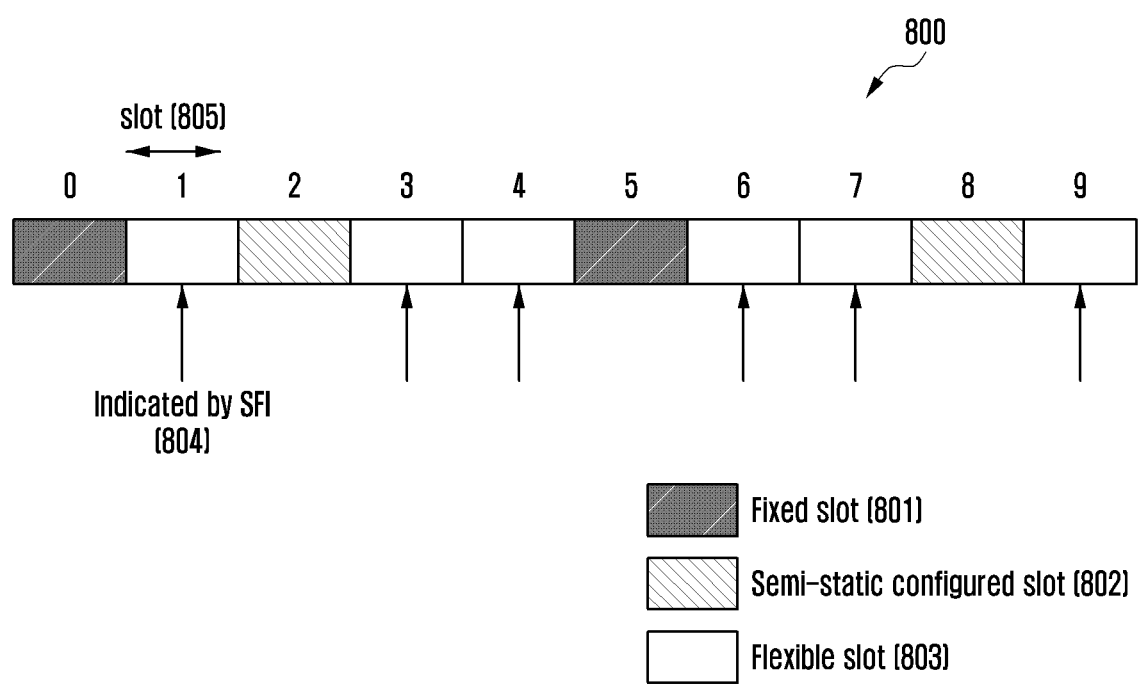
FIG. 8 is a diagram of a slot format indicator-based dynamic time division duplex (TDD) method according to an embodiment.

FIG. 8 is a diagram of a slot format indicator-based dynamic TDD method according to embodiment 2-1.

Referring to FIG. 8, 10 slots 800 having a length denoted by reference number 805 is illustrated.

A certain slot may be in a fixed slot format 801. The slot in the fixed slot format 801 is not changed by any additional configuration of the base station and is located at certain points in time (or slot indices) agreed upon between a base station and a terminal. In embodiment 2-1, the $0^{th}$ and $5^{th}$ slots are illustrated as the fixed slots 801. The reason for supporting the fixed slots 801 is to transmit a signal periodically regardless of the slot format in use by the system. For example, it may be possible to define a fixed slot format 801 for transmitting a synchronization signal block (SSB) which is always transmitted periodically in the system.

A certain slot may be in a semi-static configured slot format 802. The base station may configure certain slots in a certain slot format and transmit the corresponding configuration information to the terminal via higher layer scheduling (e.g., system information (SI) and RRC signaling). In embodiment 2-1, the $2^{nd}$ and $8^{th}$ slots are depicted as the semi-static configured slots 802.

A certain slot may be in a flexible slot format 803. Although a slot in the flexible slot format 803 is referred to as a flexible slot in this embodiment, the slot may be referred to as a dynamic slot or an unknown slot. The base station may determine the slots for use in the flexible slot format 803 and notify the terminal of the flexible slots 803 via higher layer signaling (e.g., SI or RRC signaling). In embodiment 2-1, the $1^{st}$, $3^{rd}$ slots are in the flexible slot format 803.

The base station may transmit to the terminal an SFI indicating the slot format of the flexible slot format 803 via group-common DCI.

The base station may configure the terminal to monitor the group-common DCI at the slot configured in the flexible slot format 803 via higher layer signaling (e.g., RRC signaling and MAC CE signaling). For example, assuming that the group-common DCI conveying the SFI is scrambled with a certain RNTI, e.g., SFI-RNTI, the base station may configure the terminal to monitor the group-common DCI configured with the SFI-RNTI. The base station may also configure a monitoring period for group-common DCI and a monitoring time pattern for group-common DCI to the terminal. As shown in FIG. 8, the base station may configure the terminal to perform group-common DCI monitoring at the $1^{st}$, $3^{rd}$, $4^{th}$, $6^{th}$, $7^{th}$, and $9^{th}$ slots at a period of 10 slots. In this case, the SFI may indicate a slot format of one or more slots. For example, the SFI may indicate the slot formats of the slots carrying the corresponding SFI or the slot formats of 5 slots including the slot carrying the SFI and 4 slots following the slot carrying the SFI. The base station may notify the terminal of the number of slots for which slot formats are indicated by the SFI via higher layer signaling (e.g., RRC signaling and MAC CE signaling).

The terminal may receive the configuration information transmitted by the base station for configuring the terminal to monitor the group-common DCI. The terminal may also receive the configuration information transmitted by the base station for configuring the monitoring period for group-common DCI and monitoring time pattern for group-common DCI to the terminal. The terminal may also receive the configuration information transmitted by the base station for notifying the terminal of the number of the slots for which slot formats are indicated by the SFI included in the group-common DCI. The terminal may monitor the group-common DCI carrying the SFI according to the configuration information received from the base station to obtain the slot format information about one or more slots based on the received SFI.

Embodiment 2-2

As described above, a slot may be made up of downlink, uplink, and unknown symbols, and a combination of the downlink, uplink, and unknown symbols is referred to as a slot format. A symbol designated as the unknown symbol may be overridden by DCI transmitted from a base station to a terminal. If the unknown symbol is overridden by the DCI, this indicates that a symbol designated as unknown via the DCI is used for a certain usage (e.g., downlink, uplink, gap, and measurement) as indicated by an indicator included in the DCI. The term "gap" indicates a switching time required for the terminal to switch from downlink reception to uplink transmission. The term "measurement" indicates an operation for the terminal to perform channel measurement (e.g., channel state information (CSI) measurement), power measurement (reference signal received power (RSRP) measurement), reference signal received quality (RSRQ) measurement, and reference signal strength indicator (RSSI) measurement). Embodiment 2-2 is directed to a method for utilizing an unknown symbol as indicated via the SFI.

Figure 9:
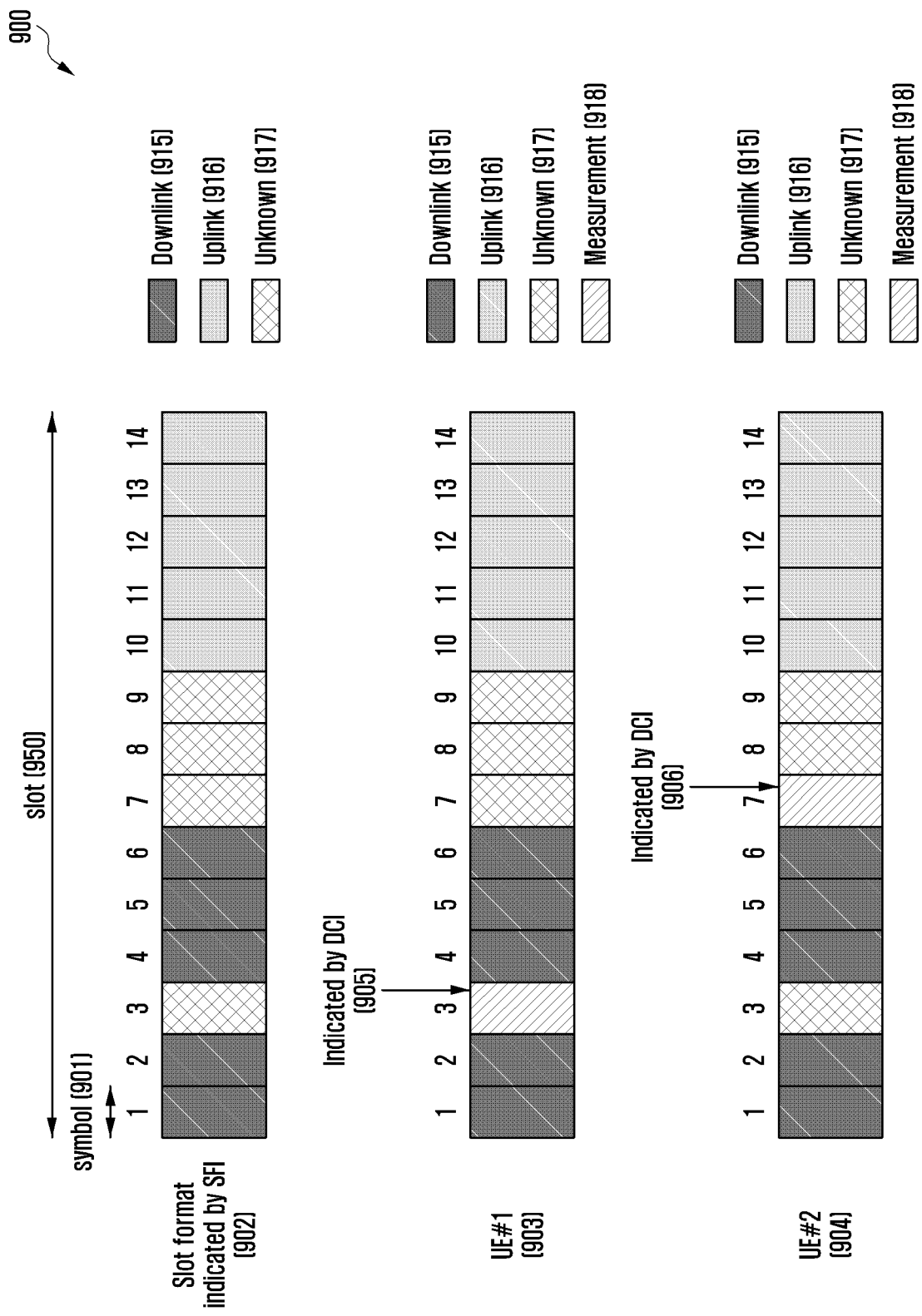
FIG. 9 is a diagram of an unknown symbol utilization method according to an embodiment.

FIG. 9 is a diagram of an unknown symbol utilization method according to embodiment 2-2.

Referring to FIG. 9, a slot 950 consists of 14 OFDM symbols, each having a length denoted by reference number 901.

A base station may transmit an SFI to a terminal via group-common DCI. The terminal may obtain the slot format information about the corresponding slot from the received SFI. That is, a slot may be composed as a certain combination of downlink, uplink, and unknown symbols. For example, FIG. 9 depicts a slot format 902 composed of the $1^{st}$, $2^{nd}$, $4^{th}$, $5^{th}$, and $6^{th}$ symbols as downlink symbols, the $10^{th}$, $11^{th}$, $12^{th}$, $13^{th}$, and $14^{th}$ symbols as uplink symbols, and the $3^{rd}$, $7^{th}$, $8^{th}$, and $9^{th}$ symbols as unknown symbols, as indicated via an SFI. A certain group of terminals that receive the same group-common DCI may receive the same SFI, and all of the terminals belonging to the group assumes the same slot format for the corresponding slot.

The base station may further transmit to the terminal an indicator indicating the usage of the unknown symbols 917. In detail, the base station may transmit to the terminal an indicator indicating the usage of the unknown symbols 917 as one of the downlink, uplink, gap, and measurement usages via UE-specific DCI.

Hereinafter, a method of utilizing the unknown symbols 917 for measurement as denoted by reference number 918 is described. This method may be applied to a case where the unknown symbols 917 are used for downlink, uplink, and gap in the same manner.

The base station may instruct a terminal to perform measurement at the unknown symbols 917 via UE-specific DCI. In embodiment 2-2, the base station may instruct UE #1 903 to perform measurement 918 at the $3^{rd}$ OFDM symbol designated as one of the unknown symbols 917 via UE-specific DCI as denoted by reference number 905. The base station may also instruct UE #2 904 to perform measurement 918 at the 7th OFDM symbol designated as one of the unknown symbols 917 via UE-specific DCI as denoted by reference number 906.

The base station may use N bits (N≥1) of the UE-specific DCIs to indicate one or more unknown symbols 917 to be used for measurement 918.

For example, the base station may instruct the terminal to perform measurement at all of the unknown symbols 917 using N=1 bit. That is, in the state that the $3^{rd}$, $7^{th}$, $8^{th}$, and $9^{th}$ symbols are designated as unknown symbols 917, the base station may transmit to the terminal a 1-bit indicator indicating whether to perform measurement 918 at all of the unknown symbols (i.e., the $3^{rd}$, $7^{th}$, $8^{th}$, and $9^{th}$ symbols).

For example, the base station may group the symbols designated as unknown symbols 917 into units (one or more symbols) with N bits (N≥1) for the terminal and indicate an unknown symbol group for use in measurement. If the number of unknown symbols is M and N bits are used to indicate whether to perform measurement, M unknown symbols may be divided into N unknown symbol groups having ceil(M/N) unknown symbols each. The base station may indicate the unknown symbols group for measurement 918 among the N unknown symbol groups using an N-bit bitmap.

The description is elaborated with reference to FIG. 9. For example, M (M=4) OFDM symbols, i.e., $3^{rd}$, $7^{th}$ $8^{th}$, and $9^{th}$ OFDM symbols, are unknown symbols and N bits (N=2) are used for indicating the unknown symbols for measurement.

In this case, the set of the unknown symbols may be divided into 2 unknown symbol groups. For example, the unknown symbols may be grouped into unknown symbol group #1 {$3^{rd}$ symbol, $7^{th}$ symbol} and unknown symbol group #2 {$8^{th}$ symbol, $9^{th}$ symbol}. The base station may indicate at least one of unknown symbol group #1 and unknown symbol group #2 for use in measurement 918 using a 2-bit bitmap indicator. The indicator may be set as listed in Table 5 below.

TABLE 5

| Indicator | Content |
|---|---|
| 00 | No measurement |
| 01 | Measurement in unknown symbol group#1 |
| 10 | Measurement in unknown symbol group#2 |
| 11 | Measurement in both unknown symbol group#1 and group#2 |

The size of the indicator, i.e., N, for indicating the unknown symbols 917 for use in measurement 918 may be a fixed value or a value configured via higher layer signaling (e.g., RRC signaling) or determined implicitly based on the number of unknown symbols 917. For example, when the number of unknown symbols 917 is M, N=ceil(M/K)(K≥1).

If the number of unknown symbols 917 is 0, the base station may not transmit the indicator indicating the unknown symbols for use in measurement 918.

The terminal may obtain SFI information from the group-common DCI transmitted by the base station. The terminal may determine the slot format of the corresponding slot based on the obtained SFI. The terminal may be instructed whether to perform measurement 918 in the unknown symbols 917 from the UE-specific DCI transmitted by the base station, which are indicated as described above. If the terminal obtains an indicator indicating to perform measurement 918 in certain unknown symbols 917 the terminal may perform channel measurement (e.g., CSI measurement), power measurement (e.g., RSRP, RSRQ, RSSI measurements), or other measurement at the corresponding unknown symbols 917.

Embodiment 3

In 5G, it may be possible to configure certain time and frequency resources as reserved resources for various purposes (e.g., forward compatibility, PDSCH rate matching configuration indication, and PUSCH rate matching configuration indication).

A base station may configure certain time/frequency resources as reserved resources to a terminal via higher layer signaling (e.g., SI and RRC signaling). The time/frequency resources configured as the reserved resources may not be used any communication between the base station and the terminal.

The base station configures certain symbols of a slot as unknown symbols for the terminal via an SFI carried in the group-common DCI. The unknown symbols may be overridden by another DCI. If overridden by another DCI, the unknown symbols may be used for the purpose as indicated by the corresponding DCI. As described above in embodiment 2, the known symbols may be used for a certain purpose such as downlink, uplink, gap, and measurement. If the unknown symbols are not overridden, the unknown symbols are assumed to be reserved resources. That is, the unknown symbols that are not overridden by another DCI are not used for any communication between the base station and the terminal.

In the following description, the reserved resources configured via higher layer signaling and the unknown symbols indicated via group-common DCI are collectively referred to as reserved resources.

Figure 10:
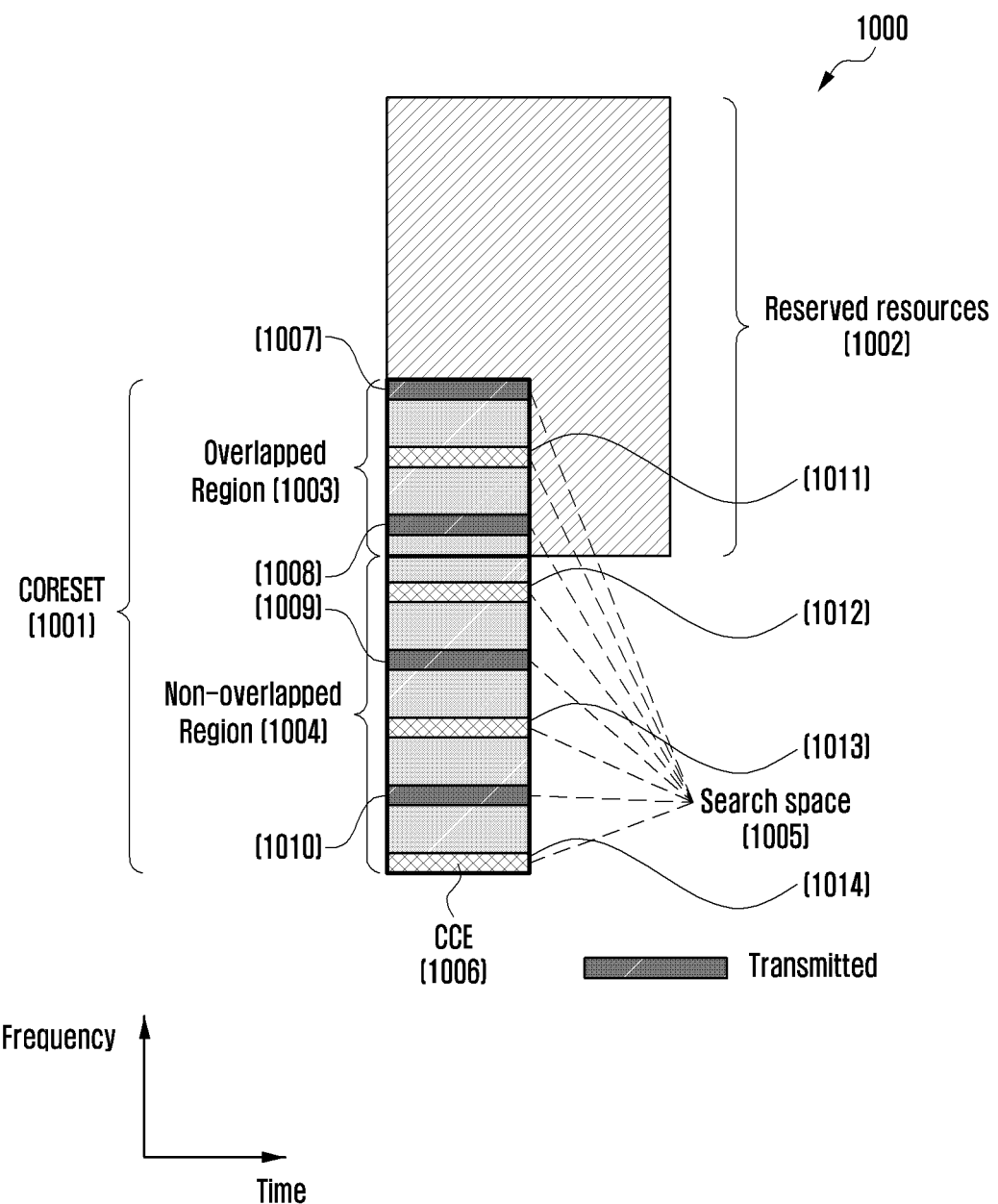
FIG. 10 is a diagram of a downlink control information transmission method according to an embodiment.

Embodiment 3 is directed to the operations of a base station and a terminal in a case where part of a CORESET is configured as reserved resources as shown in FIG. 10.

FIG. 10 is an illustration 1000 of a CORESET 1001 including search spaces 1005, which are each composed of a set of CCEs 1006 (or a set of PDCCH candidates).

Referring to FIG. 10, a time-frequency region including part of the CORESET 1001 is configured as reserved resources 1002. The CORESET 1001 may be composed of a region overlapped with the reserved resources 1002, i.e., overlapped region 1003, and a region not overlapped with the reserved resources 1002, i.e., non-overlapped region 1004. The base station may map DCI to the resources in the non-overlapped region 1004 but not to the resources in the overlapped region 1003. This is because the reserved resources 1002 cannot be used for any communication between the base station and the terminal. The terminal may receive the DCI transmitted by the base station only in the non-overlapped region 1004 of the CORESET 1001.

Hereinafter, descriptions are provided of the DCI transmission method of a base station and the control channel monitoring method of a terminal in a situation described above.

Embodiment 3-1

In a case where part of the CORESET 1001 overlaps with the reserved resources 1002, the base station may map the DCI to PDSCH candidates in the search space existing in the non-overlapped region 1004. In a case where the search space 1005 is composed of 8 CCEs 1006 (i.e., CCE 1007, CCE 1008, CCE 1009, CCE 1010, CCE 1011, CCE 1012, CCE 1013, and CCE 1014) among which 5 CCEs, i.e., (i.e., CCE 1009, CCE 1010, CCE 1012, CCE 1013, and CCE 1014) are located in the non-overlapped region 1004 as shown in FIG. 10, the base station may map the DCI only to the PDCCH candidates on the CCE 1009, CCE 1010, CCE 1012, CCE 1013, and CCE 1014.

In a case where part of the CORESET 1001 overlaps with the reserved resources 1002, the terminal may perform blind decoding only in the search space existing in the non-overlapped region 1004.

Embodiment 3-2

If part of the CORESET 1001 overlaps with the reserved resources 1001, a base station may reconfigure the search space for the corresponding terminal in consideration of the time-frequency resources (total number of REGs or CCEs) in the non-overlapped region 1004 and map DCI to certain PDCCH candidates in the reconfigured search space. The search space may be defined by Equation (1) below.

Search space=$f(Y_k$, total number of CCEs, CCE indices, AL, number of PDCCH candidates, carrier index) (1)

In Equation (1) above, f(x) denotes a function with an input x. According to Equation (1) above, the search space $Y_k$ may be determined, which denotes an arbitrary value applicable in a kth slot or subframe and may have an initial value $Y_{-1}$ determined by a UE ID or predetermined fixed value. For example, $Y_{-1}$ may be determined based on the terminal ID for terminal-specific search space or by a value agreed upon by all UEs of the common search space.

According to Equation (1) above, the search space may be expressed as a function of the total number of CCEs existing in the corresponding CORESET. Because a CCE is a group of REGs, each made up of 1 symbol in the time domain and 12 subcarriers in the frequency domain, the whole time-frequency resources configured as the CORESET determine the total number of CCEs.

If the CORESET 1001 overlaps in part with the reserved resources 1002, the base station may re-calculate the search space by substituting the total number of CCEs existing in the non-overlapped region 1004 for the total number of CCEs existing in the whole CORESET 1001. This may be expressed by Equation (2) below.

Search space=$f(Y_k$, total number of CCEs in non-overlapped region, CCE indices, AL, number of PDCCH candidates, carrier index) (2)

The base station may transmit the DCI to the corresponding terminal on a certain PDCCH candidate existing in the search space re-calculated by Equation (2) above.

If the CORESET 1001 overlaps in part with the reserved resources 1002, the terminal may re-calculate its search space in consideration of the time-frequency resources (total number of REGs or CCEs) in the non-overlapped region 1004 and perform blind decoding in the re-calculated search space. The terminal may also re-calculate the search space in the non-overlapped region 1004 of the CORESET 1001 using Equation (2) above.

Embodiment 3-3

A base station may transmit the DCI on a certain PDCCH candidate in the CORESET 1001. If the time-frequency resource of the PDCCH candidate to be transmitted overlaps in part with the reserved resources 1002, the base station may perform rate matching to transmit the corresponding PDCCH. For the example of FIG. 10, the base station may transmit the DCI on the PDCCH candidate corresponding to the CCEs 1007, 1008, 1009, and 1010. In this case, the CCEs 1007 and 1008 are located in the reserved resources 1002. Accordingly, the base station may perform rate matching to transmit the PDCCH using the CCEs 1009 and 1010 located in the non-overlapped region 1004 but not the CCEs 1007 and 1008 located in the overlapped region 1003.

If the CORESET 1001 overlaps in part with the reserved resources 1002, the terminal may perform blind decoding in the search space under the assumption that the PDCCH is transmitted after rate matching in the overlapped region 1003. For example, the terminal may perform blind decoding on the PDCCH corresponding to the CCEs 1009 and 1010 remaining after rate matching on the CCEs 1007 and 1008 located in the overlapped region 1003 at the occasion of performing blind decoding on the PDCCH candidates corresponding to the CCEs 1007, 1008, 1009, and 1010 in its search space.

Embodiment 3-4

If the CORESET 1001 overlaps in part with the reserved resources 1002, a base station may not transmit any DCI to a UE in the corresponding CORESET 1001.

If the CORESET 1001 overlaps in part with the reserved resources 1002, the terminal may not monitor, i.e., not perform blind decoding, in the corresponding CORESET 1001.

Embodiment 4

In a 5G communication system, a base station may provide a terminal with various configuration information (e.g., parameters listed in Table 3) about CORESET for transmitting downlink control channels via higher layer signaling (e.g., RRC signaling). Embodiment 4 is directed to a method for configuring REG bundling size as part of the CORESET configuration information.

In the 5G communication system, the REG bundling size of the downlink control channel may differ depending on the symbol length of the CORESET. Table 6 below shows a relationship between the control region length and REG bundling size.

TABLE 6

| Control region length | REG bundling size |
|---|---|
| 1 symbol | 2 or 6 |
| 2 symbols | 2 or 6 |
| 3 symbols | 3 or 6 |

In embodiment 4, a method of minimizing signal overhead in a situation where the REG bundling size varies depending on the CORESET symbol length is provided.

The base station may configure the REG bundling size to the terminal via higher layer signaling (e.g., RRC signaling). The REG bundling size may be selected from a set of parameter values {X, Y}. The base station may select a value from the set of parameter values and transmit the selected value to the terminal. For example, assuming a set of REG bundling size parameter values {X, Y}, the base station may select one of X and Y and notify the terminal of the selected value.

The terminal may receive the configuration information indicating the REG bundling size from the base station via higher layer signaling (e.g., RRC signaling). The terminal may interpret the REG bundling size value received from the base station based on the preconfigured CORESET symbol length.

In addition, if the terminal receives the REG bundling size value X from the base station, the terminal may perform the operations as follows based on the CORESET symbol length information.

Operation 1: If the CORESET symbol length configured to the terminal is A or B, the terminal may assume that the REG bundling size is Z.

Operation 2: If the CORESET symbol length configured to the terminal is C, the terminal may assume that the REG bundling size is X'(≠X).

If the base station configures the REG bundling size of Y to the terminal, the terminal may apply the REG bundling size Y as is.

In embodiment 4, it may be assumed that X=2, X'=3, Y=6, A=1, B=2, and C=3.

Figure 11:
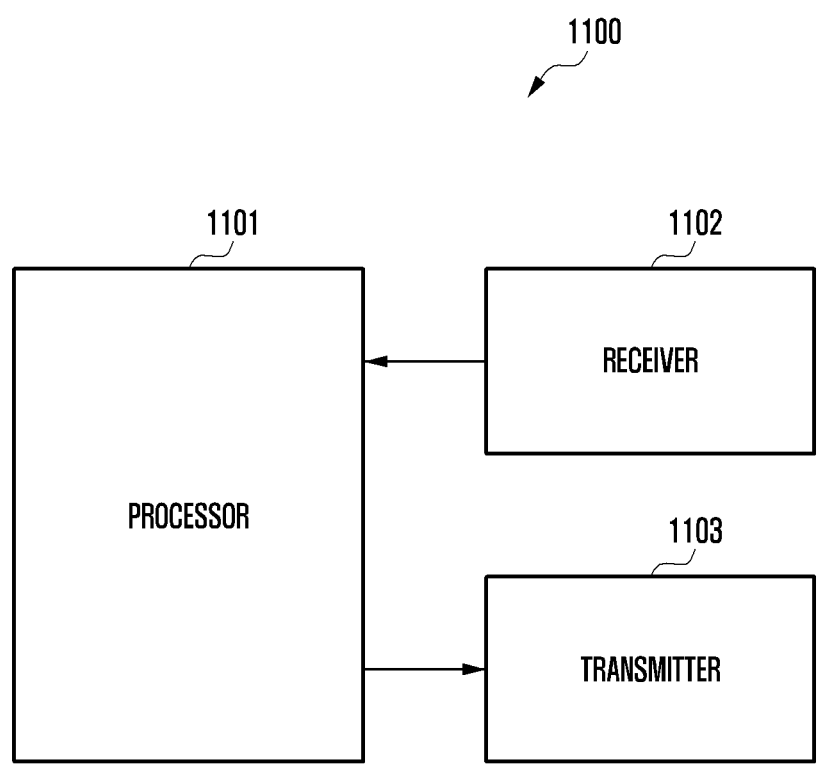
FIG. 11 is a block diagram of a terminal according to an embodiment.
Figure 12:
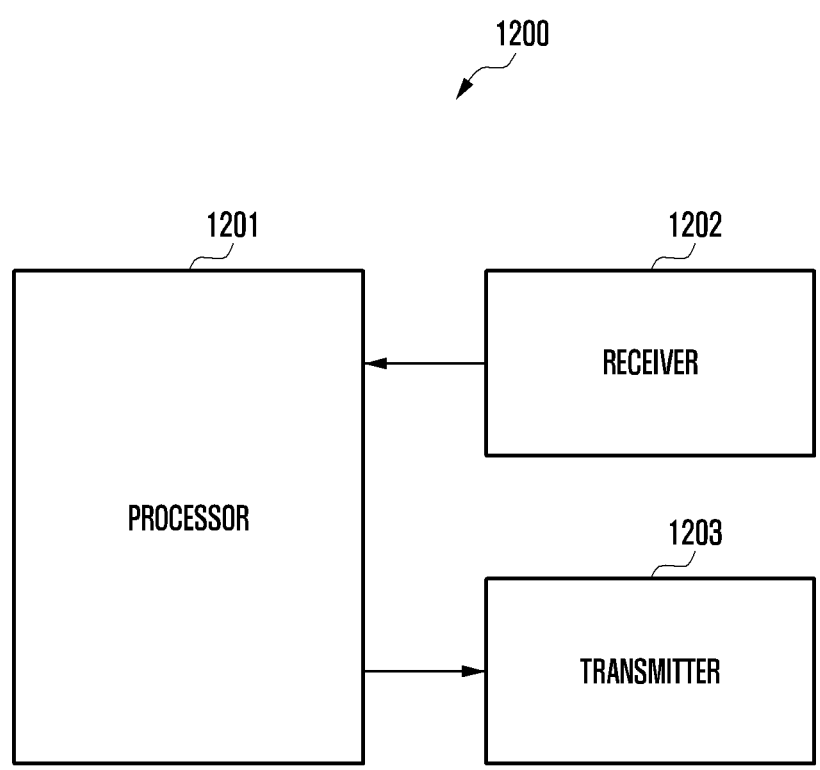
FIG. 12 is a block diagram of a base station according to an embodiment.

The terminal and base station are each composed of a transmitter, a receiver, and a processor for implementing the methods of the above embodiments as illustrated in FIGS. 11 and 12, respectively. In order to support the downlink control and data channel transmission method of the base station and downlink control and data channel reception method of the terminal as described in the above embodiments, the transmitter, receiver, and processor of each of the base station and the terminal operate according to each embodiment.

FIG. 11 is a block diagram of a terminal 1100 according to an embodiment.

Referring to FIG. 11, the terminal 1100 may include a processor 1101, a receiver 1102, and a transmitter 1103.

The processor 1101 may control overall operations of the terminal 1100. For example, the processor 1101 may control the other components differently to accomplish the PDSCH mapping type configuration method, the unknown symbol configuration method, the CORESET monitoring method, and the CORESET configuration method described in the above embodiments. The receiver 1102 and the transmitter 1103 may be collectively referred to as a transceiver. The transceiver may transmit and receive signals to and from a base station. The signals may include control information and data. The transceiver may include a radio frequency (RF) transmitter for frequency-up-converting and amplifying a signal to be transmitted and an RF receiver for low-noise-amplifying and frequency-down-converting a received signal. The transceiver may output the signal received over a radio channel to the processor 1101 and transmit the signal output from the processor 1101 over the radio channel.

FIG. 12 is a block diagram illustrating a configuration of a base station 1200 according to an embodiment.

Referring to FIG. 12, the base station 1200 may include a processor 1201, a receiver 1202, and a transmitter 1203.

The processor 1201 may control overall operations of the base station 1200. For example, the processor 1201 may control the other components differently to accomplish the PDSCH mapping type configuration method, the unknown symbol configuration method, the CORESET monitoring method, and the CORESET configuration method described in the above embodiments. The receiver 1202 and the transmitter 1203 may be collectively referred to as a transceiver. The transceiver may transmit and receive signals to and from a terminal. The signals may include control information and data. The transceiver may include an RF transmitter for frequency-up-converting and amplifying a signal to be transmitted and an RF receiver for low-noise-amplifying and frequency-down-converting a received signal. The transceiver may output the signal received over a radio channel to the processor 1201 and transmit the signal output from the processor 1201 over the radio channel.

As described above, the present disclosure is advantageous in terms of facilitating efficient provision of services with various requirements in a 5G wireless communication system supporting various numerologies with the employment of an efficient initial cell access and paging method.

The embodiments disclosed in the present disclosure and the accompanying drawings help explain and facilitate understanding of the present disclosure rather than limit the scope of the present disclosure. It is obvious to those skilled in the art that modifications and changes may be made thereto without departing from the scope of the present disclosure as defined by the appended claims and their equivalents. If necessary, the embodiments may be combined in whole or in part.

What is claimed is:

1. A method performed by a terminal in a wireless communication system, the method comprising:
receiving, from a base station via radio resource control (RRC) signaling, information for a rate matching resource, the information including time resource information and frequency resource information;
identifying resources that are unavailable for physical downlink shared channel (PDSCH) reception based on the rate matching resource;

monitoring a physical downlink control channel (PDCCH) candidate except for at least one PDCCH candidate that overlaps with the identified resources; and receiving, from the base station, downlink control information (DCI) based on the monitoring of the PDCCH candidate.

2. The method of claim 1, wherein the resources in a slot are mapped to one or more subcarriers that overlap with subcarriers of any resource block (RB) of the rate matching resource in the slot.

3. The method of claim 1,
wherein the rate matching resource is specified by the time resource information and the frequency resource information.

4. The method of claim 2,
wherein the information for the rate matching resource indicates at least one of the RB of the rate matching resource, symbols in the RB, and a periodicity and a pattern of the rate matching resource.

5. The method of claim 2,
wherein the PDCCH candidate is composed of a set of control channel elements (CCEs) corresponding to an aggregation level,
wherein each CCE is composed of six resource element groups (REGs), and
wherein each REG is one RB that spans one orthogonal frequency division multiplexing (OFDM) symbol.

6. A method performed by a base station in a wireless communication system, the method comprising:
transmitting, to a terminal via radio resource control (RRC) signaling, information for a rate matching resource, the information including time resource information and frequency resource information; and
transmitting, to the terminal, downlink control information (DCI) on a physical downlink control channel (PDCCH),
wherein resources are unavailable for physical downlink shared channel (PDSCH) reception based on the rate matching resource, and
wherein the PDCCH corresponds to a PDCCH candidate except for at least one PDCCH candidate that overlaps with the resources.

7. The method of claim 6,
wherein the resources in a slot are mapped to one or more subcarriers that overlap with subcarriers of any resource block (RB) of the rate matching resource in the slot.

8. The method of claim 6,
wherein the rate matching resource is specified by the time resource information and the frequency resource information.

9. The method of claim 7,
wherein the information for the rate matching resource indicates at least one of the RB of the rate matching resource, symbols in the RB, and a periodicity and a pattern of the rate matching resource.

10. The method of claim 7,
wherein the PDCCH candidate is composed of a set of control channel elements (CCEs) corresponding to an aggregation level,
wherein each CCE is composed of six resource element groups (REGs), and
wherein each REG is one RB that spans one orthogonal frequency division multiplexing (OFDM) symbol.

11. A terminal in a wireless communication system, the terminal comprising:

a transceiver; and
a controller coupled with the transceiver and configured to:
receive, from a base station via radio resource control (RRC) signaling, information for a rate matching resource, the information including time resource information and frequency resource information,
identify resources that are unavailable for physical downlink shared channel (PDSCH) reception based on the rate matching resource,
monitor a physical downlink control channel (PDCCH) candidate except for at least one PDCCH candidate that overlaps with the identified resources, and
receive, from the base station, downlink control information (DCI) based on the monitoring of the PDCCH candidate.

12. The terminal of claim 11,
wherein the resources in a slot are mapped to one or more subcarriers that overlap with subcarriers of any resource block (RB) of the rate matching resource in the slot.

13. The terminal of claim 11,
wherein the rate matching resource is specified by the time resource information and the frequency resource information.

14. The terminal of claim 12,
wherein the information for the rate matching resource indicates at least one of the RB of the rate matching resource, symbols in the RB, and a periodicity and a pattern of the rate matching resource.

15. The terminal of claim 12,
wherein the PDCCH candidate is composed of a set of control channel elements (CCEs) corresponding to an aggregation level,
wherein each CCE is composed of six resource element groups (REGs), and
wherein each REG is one RB that spans one orthogonal frequency division multiplexing (OFDM) symbol.

16. A base station in a wireless communication system, the base station comprising:
a transceiver; and
a controller coupled with the transceiver and configured to:
transmit, to a terminal via radio resource control (RRC) signaling, information for a rate matching resource, the information including time resource information and frequency resource information; and
transmit, to the terminal, downlink control information (DCI) on a physical downlink control channel (PDCCH),
wherein resources are unavailable for physical downlink shared channel (PDSCH) reception based on the rate matching resource, and
wherein the PDCCH corresponds to a PDCCH candidate except for at least one PDCCH candidate that overlaps with the resources.

17. The base station of claim 16,
wherein the resources in a slot are mapped to one or more subcarriers that overlap with subcarriers of any resource block (RB) of the rate matching resource in the slot.

18. The base station of claim 16,
wherein the rate matching resource is specified by the time resource information and the frequency resource information.

19. The base station of claim 17,
wherein the information for the rate matching resource indicates at least one of the RB of the rate matching resource, symbols in the RB, and a periodicity and a pattern of the rate matching resource.

20. The base station of claim 17,
wherein the PDCCH candidate is composed of a set of control channel elements (CCEs) corresponding to an aggregation level,
wherein each CCE is composed of six resource element groups (REGs), and
wherein each REG is one RB that spans one orthogonal frequency division multiplexing (OFDM) symbol.

* * * * *